United States Patent
Mourad et al.

(10) Patent No.: US 8,711,795 B2
(45) Date of Patent: Apr. 29, 2014

(54) APPARATUS AND METHOD FOR TRANSMITTING AND RECEIVING DATA STREAMS IN WIRELESS SYSTEM

(75) Inventors: Alain Mourad, Middlesex (GB); Ismael Gutierrez, Middlesex (GB)

(73) Assignee: Samsung Electronics Co., Ltd (KR)

( * ) Notice: Subject to any disclaimer, the term of this patent is extended or adjusted under 35 U.S.C. 154(b) by 148 days.

(21) Appl. No.: 13/353,857

(22) Filed: Jan. 19, 2012

(65) Prior Publication Data

US 2012/0188954 A1 Jul. 26, 2012

(30) Foreign Application Priority Data

Jan. 19, 2011 (GB) .................................. 1100901.6
Oct. 26, 2011 (GB) .................................. 1118537.8

(51) Int. Cl.
*H04W 28/04* (2009.01)

(52) U.S. Cl.
USPC .......................................................... 370/329

(58) Field of Classification Search
None
See application file for complete search history.

(56) References Cited

U.S. PATENT DOCUMENTS

| | | | |
|---|---|---|---|
| 2008/0225778 A1* | 9/2008 | Vare et al. .................... | 370/328 |
| 2009/0190677 A1 | 7/2009 | Jokela et al. | |
| 2009/0196217 A1 | 8/2009 | Himmanen et al. | |
| 2010/0085985 A1* | 4/2010 | Pekonen et al. ............. | 370/474 |
| 2010/0255851 A1* | 10/2010 | Kwak et al. ................... | 455/450 |
| 2012/0127954 A1* | 5/2012 | Lim et al. ..................... | 370/330 |

OTHER PUBLICATIONS

Digital Video Broadcasting (DVB); Frame Structure Channel Coding and Modulation for a Second Generation Digital Terrestrial Television.
Broadcasting System (DVB-T2); Final Draft ETSI EN 302 755 V1.2.1, European Standard, Oct. 2010.

* cited by examiner

*Primary Examiner* — Chi Pham
*Assistant Examiner* — Raul Rivas
(74) *Attorney, Agent, or Firm* — The Farrell Law Firm, P.C.

(57) ABSTRACT

A method for transmitting data including a plurality of data streams in a wireless system. The method includes receiving one or more data streams; mapping the received data streams to an additional physical slot; configuring one or more frames including the additional physical slots; and transmitting the one or more frames at one or more radio frequencies.

18 Claims, 17 Drawing Sheets

L1-PRE

| Field | Size (bits) |
|---|---|
| Type | 8 |
| BWT_EXT | 1 |
| S1 | 3 |
| S2 | 4 |
| L1_Repetition_Flag | 1 |
| PAPR | 4 |
| PILOT_PATTERN | 4 |
| GUARD_INTERVAL | 3 |
| L1_CONFIG_MOD | 4 |
| L1_CONFIG_COD | 2 |
| L1_CONFIG_FEC_TYPE | 2 |
| L1_CONFIG_INFO_SIZE | 18 |
| L1_DYN_MOD | 4 |
| L1_DYN_COD | 2 |
| L1_DYN_FEC_TYPE | 2 |
| L1_DYN_INFO_SIZE | 18 |
| L1_OFFSET | 8 |
| L1_CONFIG_AVAILABLE | 1 |
| PNC_RF_FREQUENCY | 32 |
| NUM_SYMBOLS_NGH_FRAME | 12 |
| NGH_SLOT_INTERVAL | 30 |
| NUM_SYMBOLS_SLOT | 12 |
| TX_ID_AVAILABILITY | 8 |
| CELL_ID | 16 |
| NETWORK_ID | 16 |
| NGH_SYSTEM_ID | 16 |
| REGEN_FLAG | 3 |
| Reserved | 10 |
| CRC_32 | 32 |

FIG. 12

L1-CONFIG

| Field | Size (bits) |
|---|---|
| SUB_SLICES_PER_FRAME | 15 |
| NUM_PLP | 8 |
| NUM_AUX | 4 |
| AUX_CONFIG_RFU | 8 |
| NUM_RF | 3 |
| NUM_LNC | 3 |
| For i=0..NUM_RF-1 { | |
|     RF_IDX | 3 |
|     FREQUENCY | 32 |
|     NGH_SLOT_INTERVAL | 30 |
|     NUM_SYMBOLS_SLOT | 12 |
|     NGH_SLOT_OFFSET | 30 |
|     NUM_SLOTS_x_CYCLE | 8 |
|     For j=0..NUM_SLOTS_x_CYCLE-1 { | |
|         LNC_IDX | 3 |
|     } | |
| } | |
| For i=0 .. NUM_PLP – 1 { | |
|     PLP_ID | 8 |
|     PLP_TYPE | 3 |
|     PLP_PAYLOAD_TYPE | 5 |
|     FF_FLAG | 1 |
|     LNC_IDX | 3 |
|     FIRST_FRAME_IDX | 8 |
|     PLP_GROUP_ID | 8 |
|     PLP_COD | 3 |
|     PLP_MOD | 3 |
|     PLP_ROTATION | 1 |
|     PLP_FEC_TYPE | 2 |
|     PLP_NUM_BLOCKS_MAX | 10 |
|     FRAME_INTERVAL | 8 |
|     TIME_IL_LENGTH | 8 |
|     TIME_IL_TYPE | 1 |
|     IN_BAND_FLAG | 1 |
|     RESERVED_1 | 10 |
| } | |
| RESERVED_2 | 32 |
| For i=0..NUM_AUX-1 { | |
|     AUX_RFU | 32 |
| } | |
| CRC_16 | 16 |

*FIG. 13*

L1-DYNAMIC

| Field | Size (bits) |
|---|---|
| FRAME_IDX | 8 |
| SLOT_IDX | 8 |
| SUB_SLICE_INTERVAL | 22 |
| TYPE_2_START | 22 |
| L1_CHANGE_COUNTER | 8 |
| RESERVED_1 | 8 |
| for i=0..NUM_PLP-1 { | |
|     PLP_ID | 8 |
|     PLP_START | 22 |
|     PLP_NUM_BLOCKS | 10 |
|     RESERVED_2 | 8 |
| } | |
| RESERVED_3 | 8 |
| For i=0..NUM_AUX-1 { | |
|     AUX_RFU | 48 |
| } | |
| CRC_16 | 16 |

INBAND SIGNALLING

| Field | Size (bits) |
|---|---|
| PADDING_TYPE | 2 |
| PLP_L1_CHANGE_COUNTER | 8 |
| RESERVED_1 | 8 |
| for j=0..P_I-1 { | |
|     SUB_SLICE_INTERVAL | 22 |
|     CURRENT_PLP_START | 22 |
|     RESERVED_2 | 8 |
| } | |
| CURRENT_PLP_NUM_BLOCKS | 10 |
| NUM_OTHER_PLP_IN_BAND | 8 |
| for i=0..NUM_OTHER_PLP_IN_BAND-1{ | |
|     PLP_ID | 8 |
|     PLP_START | 22 |
|     PLP_NUM_BLOCKS | 10 |
|     RESERVED_3 | 8 |
| } | |
| RESERVED_4 | Rest of BB frame |
| CRC_16 | 16 |

*FIG. 14*

APPARATUS AND METHOD FOR TRANSMITTING AND RECEIVING DATA STREAMS IN WIRELESS SYSTEM

PRIORITY

This patent application claims priority under 35 U.S.C. §119(e) to Patent Applications filed in the United Kingdom Intellectual Property Office on Jan. 19, 2011 and assigned Serial No. GB 1100901.6, and Oct. 26, 2011 and assigned Serial No. GB 1118537.8, the content of each of which is incorporated herein by reference.

BACKGROUND OF THE INVENTION

1. Field of the Invention

The present invention relates generally to wireless systems, and more specifically, but not exclusively, to a method and apparatus relating to transmission and reception of data streams in digital video broadcast systems.

2. Description of the Related Art

A wireless system, such as a digital video broadcasting system, may transmit data in the form of a sequence of frames arranged in a frame structure. A digital video broadcasting system generally complies with digital video broadcasting standard, and the digital broadcasting standard may include, for example, Digital Video Broadcasting (DVB), Advanced Televisions Systems Committee (ATSC), Integrated Services Digital Broadcasting (ISDB) or Digital Multimedia Broadcasting (DMB). Each frame typically comprises a preamble section and a data section, the preamble section and the data section being time-multiplexed. The data section may include data that is arranged in the form of a number of data streams that may be referred to as physical layer pipes (PLP). A physical layer pipe may carry, for example, a service such as a video channel provided to a user. Data or data streams from the frames may be received using signaling information. The signaling may be referred to as physical layer signaling, or Layer 1 (L1) signaling. The signaling may indicate a modulation or coding scheme to be used for receiving data, and it may indicate sections of a data field to be decoded, or indicate information needed for data reception such as the location of a data stream within the data section.

Referring to the Digital Video Broadcasting (DVB) standard, Digital Video Broadcast standard frame structures may provide physical slots within the DVB physical frame structure, which are reserved for future use. For example, Digital Video Broadcasting Terrestrial 2" generation (DVB-T2), the terrestrial broadcasting standard, has a superframe structure including multiple frames, and includes slots that do not carry DVB-T2 signals, in the superframe or each frame. It is referred to as Future Extension Frame (FEF) slots. In other words, FEF slots may be provided in addition to the parts of the frame structure which are for transmission of signals intended for reception by conventional fixed Digital Video Broadcast receivers.

Referring to Digital Video Broadcasting Next Generation Handheld (DVB-NGH) for reception of mobile broadcasting, which is currently being established, digital video broadcasting systems may provide for the transmission of signals specifically intended for reception by mobile broadcasting receivers and hand held devices. Such signals may be, for example, of lower bandwidth and have more robust modulation and coding than signals intended for reception by fixed receivers.

There have been proposals to use the additional physical slots, such as the FEF slots, for the transmission of signals intended for reception by handheld receivers. Typically, the additional physical slot includes signaling information for reception of data transmitted on the physical slots or frames.

However, such a scheme, in which the signaling information is arranged in each of the physical slots, may suffer from limited capacity, due to short physical slot duration and high signaling overhead. Furthermore, such a scheme may be limited in terms of achievable statistical multiplexing gain, due to the limited capacity that may be achieved.

SUMMARY OF THE INVENTION

An aspect of the present invention provides an apparatus and method for transmitting and receiving data streams in a wireless system, to mitigate the problems with the prior art systems.

Another aspect of the present invention provides an apparatus and method for transmitting and receiving data streams in a wireless system, to solve the problems that the conventional scheme may suffer from limited capacity, due to short physical slot duration and high signaling overhead, and may be limited in terms of multiplexing gain, due to the limited capacity.

In accordance with one aspect of the present invention, there is provided a method for transmitting data including a plurality of data streams in a wireless system. The method includes receiving one or more data streams; mapping the received data streams to an additional physical slot; configuring one or more frames including the additional physical slots; and transmitting the one or more frames at one or more radio frequencies.

In accordance with another aspect of the present invention, there is provided an apparatus for transmitting data including a plurality of data streams in a wireless system. The apparatus includes a first gateway for mapping data streams to one or more logical channels each including one or more logical frames; one or more first modulators for generating data to be included in each physical slot based on the logical channels; a physical slot agent for distributing the data to be included in each physical slot to one or more second modulators; and the one or more second modulators for modulating and transmitting a frame including the distributed physical slot data.

In accordance with further another aspect of the present invention, there is provided a method for receiving data including a plurality of data streams in a wireless system. The method includes receiving one or more frames at one or more radio frequencies; obtaining a location of an additional physical slot of each frame; and receiving data streams allocated to the additional physical slot.

In accordance with yet another aspect of the present invention, there is provided an apparatus for receiving a broadcast frame in a wireless system. The apparatus includes a logical channel selector for extracting signaling information related to a logical channel; and one or more Radio Frequency (RF) selector for receiving an RF signal and selecting a physical slot selected by the logical channel selector.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 12 is a table showing the L1-Pre signaling field in an embodiment of the present invention;

FIG. 13 is a table showing the L1-config signaling field in an embodiment of the present invention;

FIG. 14 is a table showing the L1-dynamic and Inband signaling fields in an embodiment of the present invention;

DETAILED DESCRIPTION OF EXEMPLARY EMBODIMENTS

Embodiments of the present invention will be described in connection with the Digital Video Broadcasting Terrestrial $2^{rd}$ generation (DVB-T2) system or the Digital Video Broadcasting Next Generation Handheld (DVB-NGH) system now under establishment, by way of example. However, it will be understood that this is by way of example only and that other embodiments may involve other wireless broadcast systems or unicast/mulitcast systems; embodiments of the present invention are not limited to the use for transmission of digital video signals.

Figure 1:
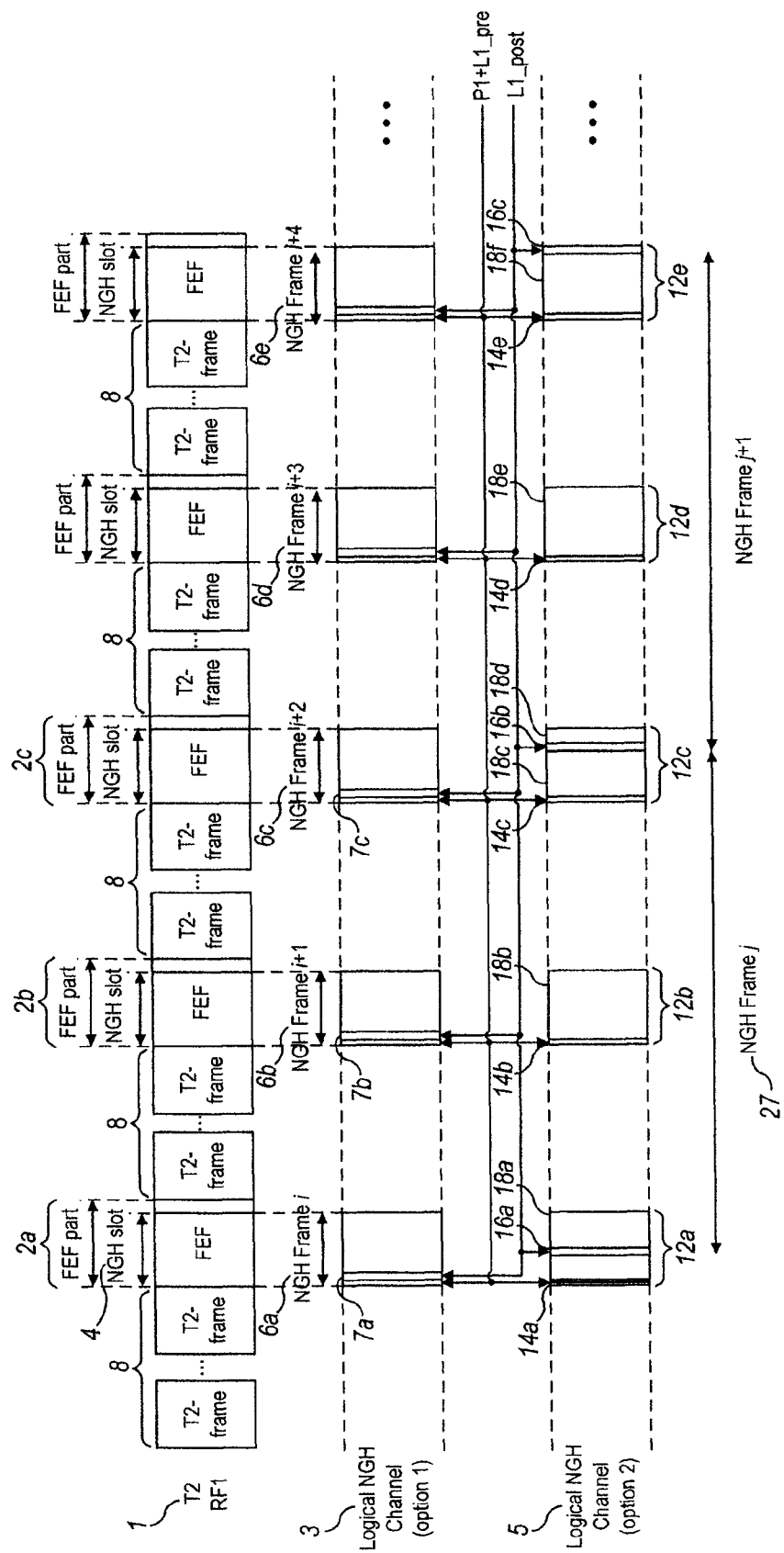
FIG. 1 is a schematic diagram showing physical slots according to an embodiment of the present invention.

As illustrated in FIG. 1, existing Digital Video Broadcast frame structures, e.g., DVB-T2 system, may provide for FEF slots 2a, 2b, 2c within a transmission sequence 1 of a radio frequency channel. The FEF slots may also be referred to as FEF parts or FEF sections. The FEF slots are physical slots, which are not used for transmission of DVB-T2 signals and may be reserved for future use. In FIG. 1, DVB-T2 data is transmitted in T2-frames 8, and the FEF slots may be provided in addition to the parts of the frame structure which are for transmission of signals intended for reception by conventional DVB-T2 receivers.

There have been proposals to use the FEF slots, in which the existing DVB-T2 data may not be transmitted, for the transmission of signals intended for reception by handheld receivers, e.g., DVB-NGH receivers. In this case, all or some of the FEF slots are used for transmission of NGH signals, and these are called NGH slots 4. The NGH slots may also be referred to as NGH parts and NGH sections. Although the following description will be made in conjunction with FEF slots, NGH signals will be transmitted actually in NGH slots which are all or some of the FEF slots. The simplest example of such a scheme is illustrated as "Option 1" 3 in FIG. 1. It can be seen that the NGH signals are divided and transmitted as a series of logical NGH frames (6a to 6e) on a logical NGH channel 3, each logical frame 6a, 6b, 6c being transmitted within a separate FEF slot 2a, 2b, 2c. In other words, one logical NGH frame is allocated to every FEF slot. NGH frame including NGH data is called logical NGH frame (LNF) because it is physically transmitted in FEF slot or NGH slot which is not greater than the FEF slot. The logical NGH frame, NGH frame and LNF will be used in the same meanings. In addition, a channel over which the NGH frames are continuously transmitted is referred to as a logical NGH channel (LNC). The logical NGH channel, NGH channel and LNC will be used in the same meanings. Physically, the logical NGH channel may be arranged and transmitted in a plurality of frequencies and times, and will be described in detail in conjunction with embodiments of the present invention. As shown in FIG. 1, the logical NGH frame 6a may occupy a NGH slot 4 that may be smaller, but no larger, than the FEF slot 2a. Each logical NGH frame has associated signaling information; this would be typically transmitted as a preamble 7a, 7b, 7c in each FEF slot. However, such a scheme, i.e., a scheme of transmitting each logical NGH frame in each FEF slot and arranges signaling information in each logical NGH frame, may suffer from limited capacity, due to high signaling overhead.

Figure 2:
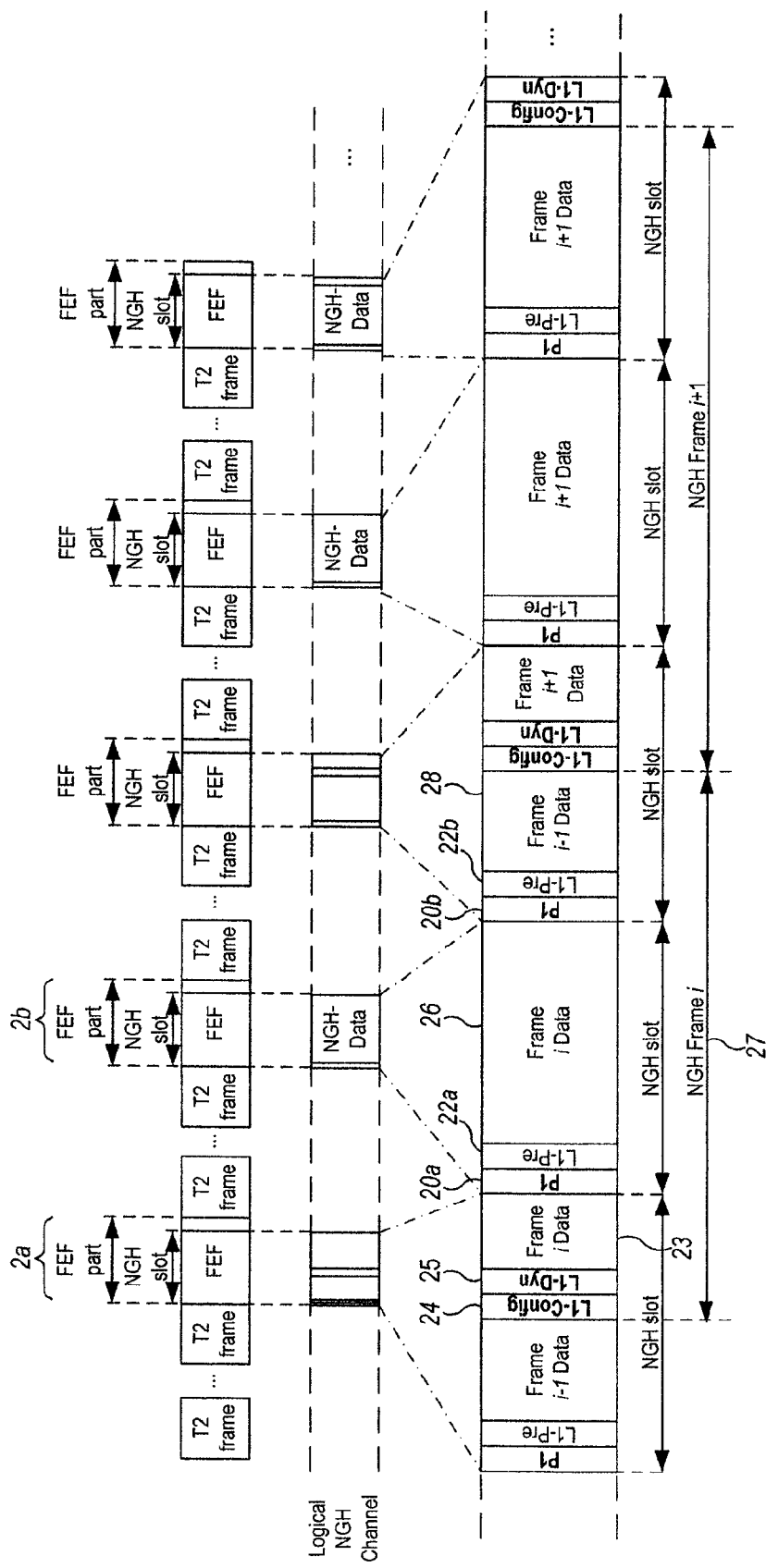
FIG. 2 is a schematic diagram showing mapping of a logical frame to physical slots in an embodiment of the present invention.

In a first embodiment of the present invention, as illustrated by FIG. 1 as "Option 2" 5 and by FIG. 2, a logical NGH frame 27 is configured in two or more FEF slots 2a, 2b and 2c, so that the length of the logical NGH frame 27 may be greater than the length of a FEF slot 2a, 2b. In other words, one logical NGH frame may be configured by combining the data transmitted in two or more FEF slots, and this may be expressed as FEF bundling. In this case, the ratio of signaling information for signaling overhead and data capacity may be reduced compared to the case where the length of logical NGH frame is limited to the length of FEF slot, like "Option 1" 3. In the case where they are transmitted over multiple Radio Frequency (RF) channels, the two or more FEF slots may be within a transmission sequence for different radio frequency channels and the logical frames may be arranged to have a constant length, even though the length of FEF slots may vary between the radio frequency channels. The length of the logical NGH frames may be set to an optimum value in terms of a tradeoff between signaling overhead and data acquisition time for a receiver requesting access to the additional data.

The signals intended for reception by NGH receivers typically comprise several data streams, that may be physical layer pipes (PLPs), and a first set of these data streams may be mapped onto a series of logical NGH frames typically. As illustrated in FIG. 1, in an embodiment of the invention, a given logical NGH frame 27 may be transmitted in at least parts of two or more FEF slots, also referred to as FEF parts. In the case of logical NGH frame j of FIG. 1, it can be seen that this logical NGH frame j is transmitted in three FEF slots, which may be referred to as additional physical slots 12a, 12*b*, and 12*c*. The length of a logical NGH frame may accordingly be independent of the length of an FEF slot, so that the logical NGH frame may be arranged to have a lower proportion of signaling information to data capacity than would be the case (Option 1) if the length of the logical NGH frame were limited by the length of an additional Physical slot (FEF slot). As illustrated by FIG. 2, a given logical NGH frame 27, typically comprises signaling information and data, the signaling information typically comprising "P1" 20*a*, 20*b* and "L1-pre" 22*a*, 22*b*, "L1-config" 24, and "L1-dynamic" 25. The "P1", "L1-pre", "L1-config", and "L1-dynamic" will be understood with reference to details of "ETSI EN 302 755" (DVB-T2 standard document) unless stated otherwise in the specification. The "L1-config" and "L1-dynamic" in all will be referred to as "L1-post". The data sections 23, 26 and 28 comprise physical layer pipes. The physical layer pipes may overlap in the time domain and be multiplexed in the frequency domain, for example.

In the first embodiment of the present invention, P1 and L1-pre signaling information 20*a*, 22*a*, 20*b*, 22*b*, etc. may be transmitted in every additional physical slot 2*a*, 2*b*, etc. which may be FEF slot, and the signaling information indicates a start of the slot and includes physical layer parameters to be used when the transmission in each additional physical slot is received. L1-post signaling information 24, 25, etc. such as L1-dynamic and L1-config may not be transmitted in every additional physical slot, because basically it is transmitted on an NGH frame basis. Data 18*a*, 18*b*, 18*c*, 18*d*, 18*e*, and 18*f* such as payload data may be transmitted within each additional physical slot.

The L1 config is a section in which L1-config signaling information is transmitted, and the L1-config signaling information typically includes information that is valid for each frame of the superframe including multiple frames, and is the same for each logical NGH frame of the superframe. The L1-dynamic information typically varies from logical NGH frame to logical NGH frame, and includes information for decoding the physical layer pipe within the logical NGH frame. Typically, L1-dynamic information may include a start address of the physical layer pipe, for example.

The signaling information is arranged taking into account the compatibility and signaling overhead with the existing system, and the content of the signaling information. For example, referring to FIG. 2, P1 and L1-pre information is transmitted in every NGH slot. This is to take into account the compatibility with the existing DVB-T2 system. On the other hand, the L1-config information and the L1-dynamic information are arranged in the location of a relevant symbol in NGH slot, taking into account the start or end of the logical NGH frame. Although not shown, if the signaling information of L1-config information is small in quantity, the L1-config information may be transmitted in every NGH slot together with P1 and L1-pre information. L1-pre information may be arranged in the location corresponding to the start or end of the logical NGH frame if the existing system (T2) receivers and the NGH receivers have no problem in receiving existing signal (T2 signals) and NGH signals, respectively, even though the L1-pre information is not arranged in every NGH slot. Each of the L1-config information and the L1-dynamic information may be deleted depending on the content of its signaling information.

In embodiments of the present invention, NGH slots within a sequence of additional physical slots (FEF slots) are bundled together as described above to form a logical NGH channel for transmitting a set of data streams, and a series of logical NGH logical frames within a logical channel are mapped to the sequence of additional physical slots, for example, FEF slots. The sequence of logical NGH frames may be transmitted over one or more RF channels. If the sequence is transmitted over a single RF channel, then a tuner needs not to re-tune between additional physical slots in order to receive the sequence of logical NGH frames. However, if the sequence 30*a* . . . 30*h* of a logical NGH channel or a series of logical NGH frames is transmitted over multiple radio frequencies RF1, RF2, RF3 and RF4, i.e., is chosen to fall on several radio frequency channels, as in a second embodiment illustrated by FIG. 3, then a logical channel with a larger capacity may be formed, and also the logical channel may benefit from frequency diversity. A single channel may be formed having a large data capacity resulting from the data capacity of the sequence of additional physical slots, rather than multiple channels each with a smaller data capacity, so that services may be multiplexed onto the single channel with a resulting gain in terms of statistical multiplexing.

Figure 3:
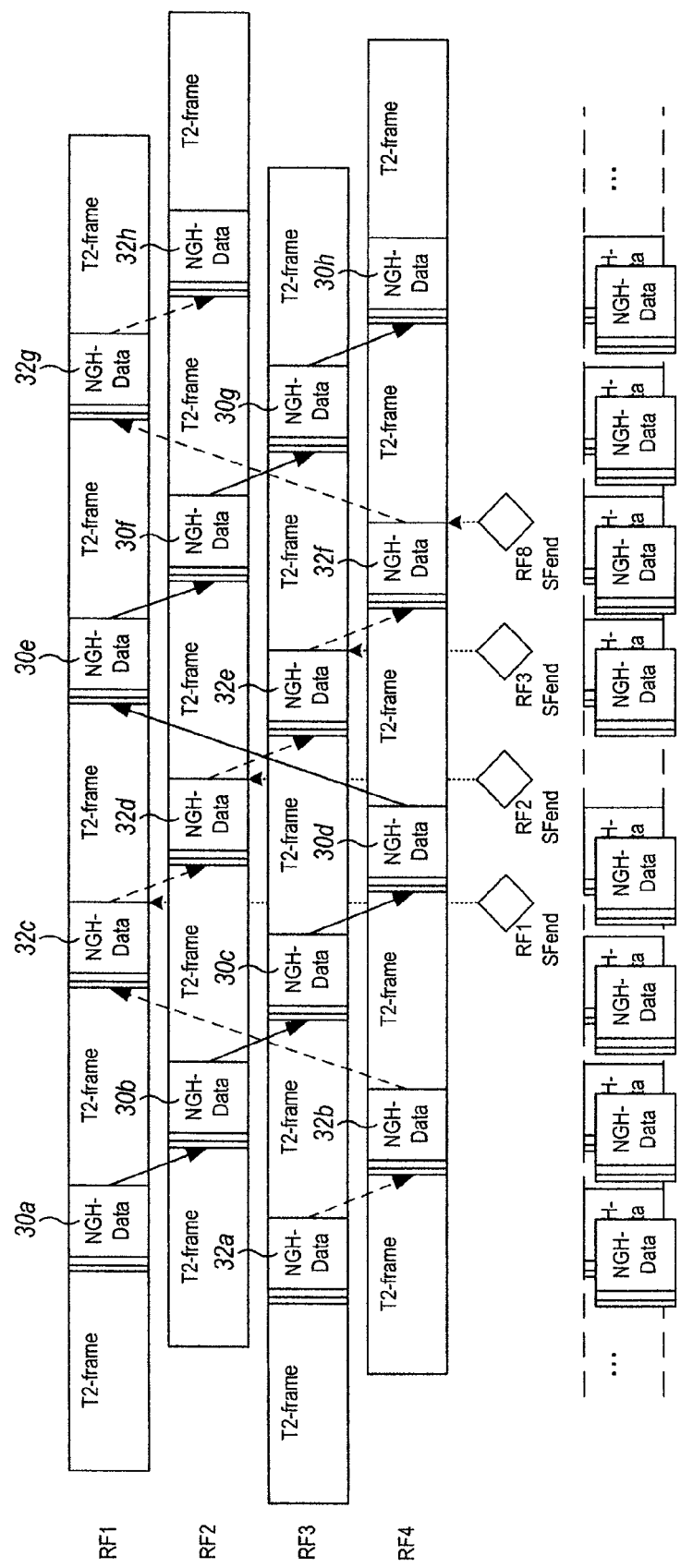
FIG. 3 is a schematic diagram showing logical channels according to an embodiment of the present invention.

As shown in FIG. 3, a guard interval is provided between each additional physical slot and each preceding additional physical slot of the sequence 30*a* . . . 30*h*, to allow re-tuning of a tuner between the reception of each of the additional physical slots, so that a single tuner may be used to receive the sequence. For example, after receiving 30*a* over RF1 using a single tuner, it is possible to tune to RF2 before receiving 30*b*.

As also shown by FIG. 3, a second logical NGH channel can be formed by mapping a second set of data streams onto a second series of logical NGH frames and mapping the second sequence of logical NGH frames to a second sequence of additional physical slots, for example FEF slots 32*a* . . . 32*h*. As shown in FIG. 3, the second sequence of additional physical slots 32*a* . . . 32*h* may not include any of the first sequence of said additional physical slots 30*a* . . . 30*h*, so that the second logical channel may make use of further additional physical slots beyond those that may be received using a single tuner. Further logical channels may be provided by further sequences of additional physical slots.

In cases where more than one logical channel is provided, one of the logical channels may be designated as a primary logical channel, which may be referred to as a Primary NGH Channel (PNC) and the others as secondary logical channels, which may be referred to as Secondary NGH Channels (SNC). The primary logical channel may be formed from physical slots that are selected for greater robustness, greater capacity, shorter intervals between physical slots, and/or lower overhead, and the primary logical channel may be used for first acquisition of a signal by a receiver or for fast zapping. The primary logical channel may convey L1-config information to enable acquisition of a service provided by a secondary logical channel. In other words, the primary logical channel serves as an entry point to a service provided by a secondary logical channel. Thus, a receiver requiring access to services carried on a secondary logical channel may first receive the primary logical channel, which will provide L1-config information to enable acquisition of a service provided by a secondary logical channel or further logical channels. As a result, it may only be necessary to convey L1-config information in every frame of the primary logical channel, and not in every frame of a secondary logical channel, reducing signaling overhead and increasing data capacity of the second and further channels.

The L1-config information may indicate a configuration of one or more of said plurality of data streams, and may be carried by each logical frame that is mapped to the primary logical channel, to reduce the delay in accessing a data stream. The L1-config information may also be carried by the first logical frame in a superframe of a secondary logical channel, because there may be system parameters that may be changed in units of a superframe which is a set of multiple frames. Even in this case, it is not necessary to be carried by other logical frames in the secondary logical channel except for the primary logical channel, to reduce the signaling overhead.

In an embodiment of the invention, the L1-config information may include information relating to the sequences of additional physical slots forming the primary and secondary logical channels.

By contrast, L1-dynamic information may be included in each logical frame of the primary and secondary logical channels, but the L1-dynamic information may only carry information relating to the respective logical channel, reducing signaling overhead.

Figure 4:
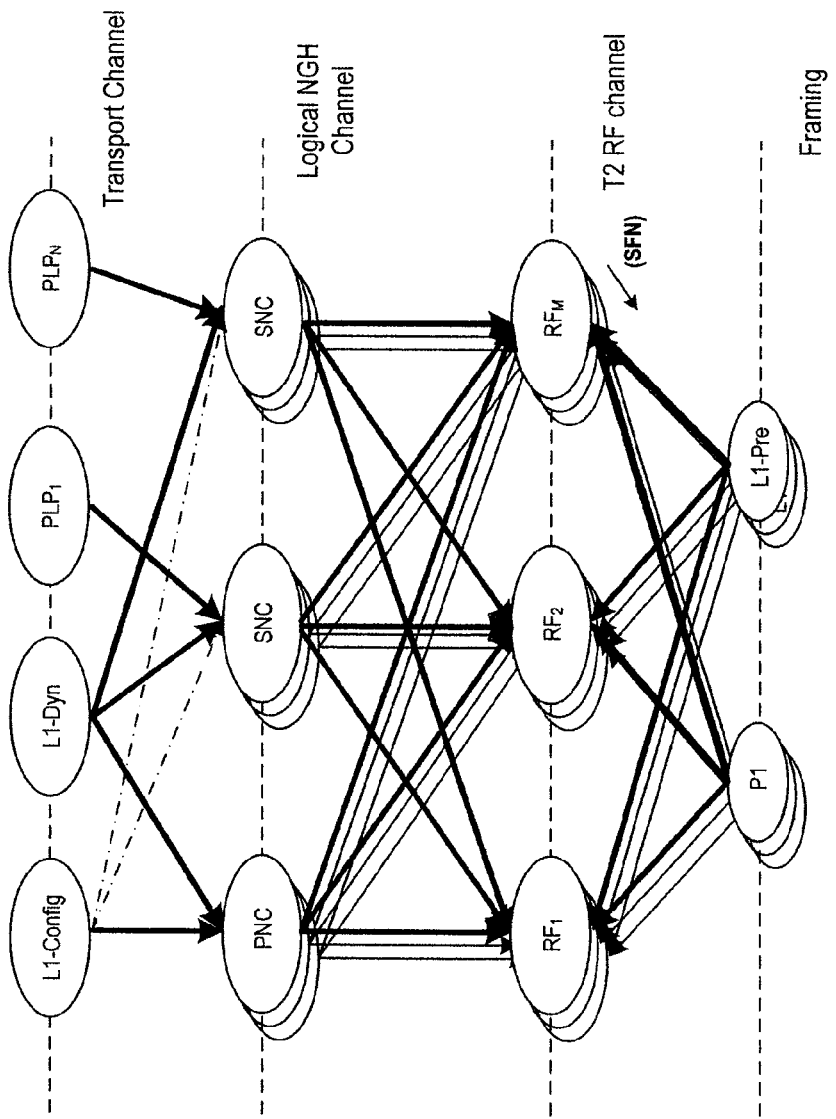
FIG. 4 is a schematic diagram showing mapping of signaling information to logical channels according to an embodiment of the present invention.

The arrangement of configuration information (for example L1-config) and dynamic signaling information (for example L1-dynamic) within primary and secondary channels is illustrated by FIG. 4. It can be seen that the L1-dynamic signaling is carried by each of all logical channels including the PNC and SNC, whereas the L1-config signaling is carried primarily by the PNC logical channel, and the dashed lines indicate that the L1-config signaling is carried by only a subset of the frames (e.g., the first frame of the superframe of SNC) of the SNC logical channels. FIG. 4 also illustrates that the PNC and SNC logical channels each include FEF slots on a number of RF channels.

Figure 5:
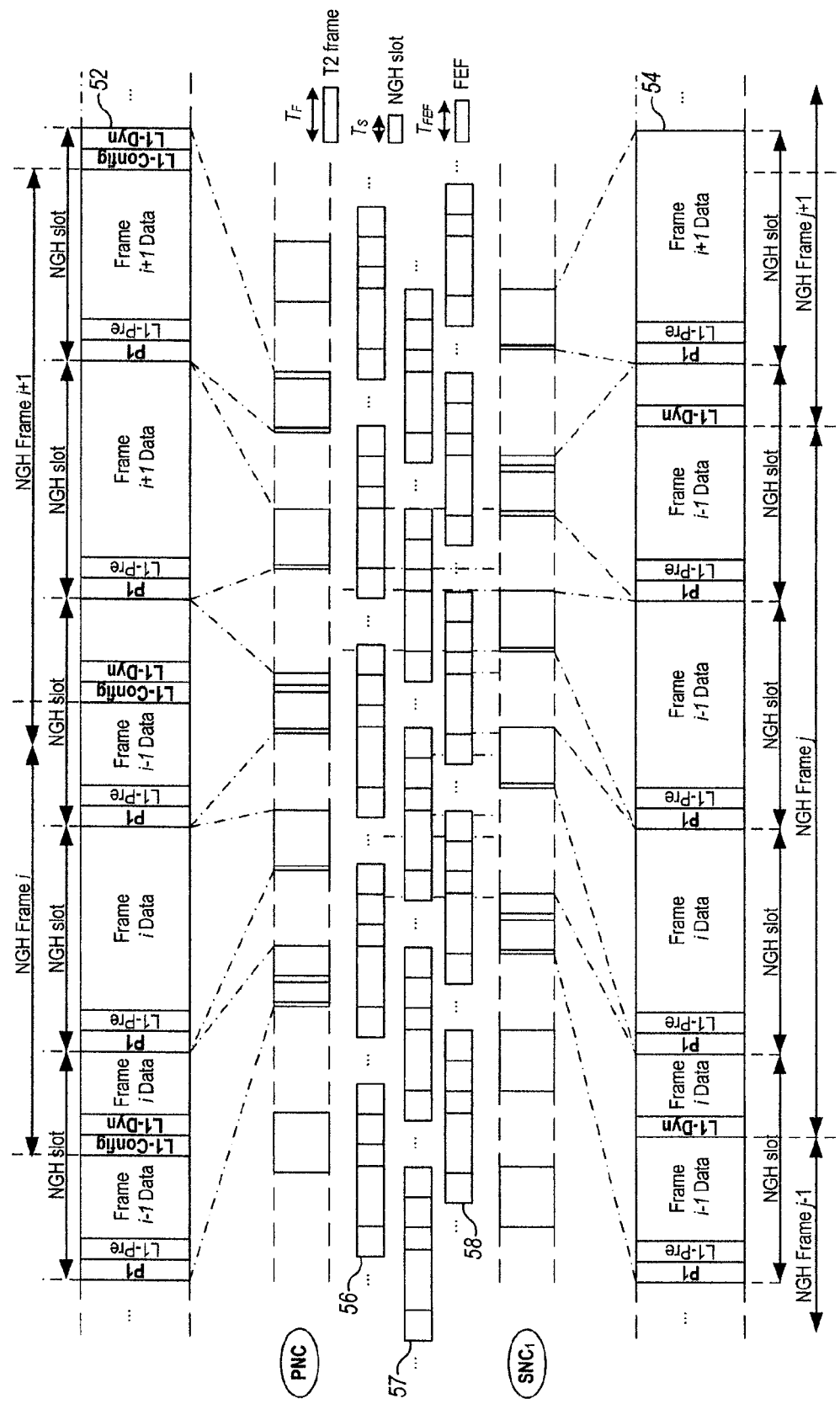
FIG. 5 is a schematic diagram showing mapping of a primary channel and a secondary logical channel to physical slots in an embodiment of the present invention.

A third embodiment corresponds to a method of generating multiple logical channels, unlike the second embodiment of generating one logical channel. FIG. 5 illustrates how a sequence of data frames 52 forming a primary logical channel and a sequence of data frames 54 forming a secondary logical channel may be mapped to within FEF slots on a three RF channels 56, 57, 58.

In the case of a primary logical channel 52, L1-config information and L1-dynamic information are arranged in the location of a symbol in an NGH slot related to the location of the start or end of each logical NGH frame. On the other hand, in the case of a secondary logical channel 54, only L1-dynamic information is arranged in the location of a symbol in an NGH slot related to the location of the start or end of each logical NGH frame. In the example of FIG. 5, first, second and third NGH slots of the primary logical channel 52 are transmitted at RF1 56, RF2 57 and RF3 58, respectively, and the first, second and third NGH slots include part of an (i−1)-th logical frame, all of an (i)-th logical frame, and part of an (i+1)-th logical frame. Boundaries among the (i−1)-th, (i)-th and ((i+1)-th logical frames may be determined from the location of L1-config information and L1-dynamic information. In addition, first, second and third NGH slots of the secondary logical channel 54 are transmitted at RF3 58, RF1 56 and RF2 57, respectively, and the first, second and third NGH slots include part of an (i−1)-th logical frame of the secondary logical channel and part of an (i)-th logical frame thereof. The boundary between the (i−1)-th and (i)-th logical frames may be determined from the location of the L1-dynamic information.

Typically, each logical frame for a given superframe has the same number of Orthogonal Frequency Division Multiplexing Symbols.

Digital video broadcast systems may include repeaters or gap fillers to provide coverage in regions where propagation from a main transmitter antenna is poor. In an embodiment of the invention, physical slots forming at least one logical channel are selected for retransmission at a repeater or gap filler in preference to the other received data, such as Digital Video Broadcasting signals intended for reception by fixed receivers. This may improve the efficiency of the repeater, since only data received within the additional physical slots may need to be re-transmitted, as the additional data may be intended for reception by handheld devices. The handheld devices may require a stronger signal than is required for reception of the first data transmitted within the physical frame structure which may be intended for reception by fixed receivers that may have rooftop antennas. Furthermore, only a single tuner may be required at the repeater for each logical channel.

Figure 6:
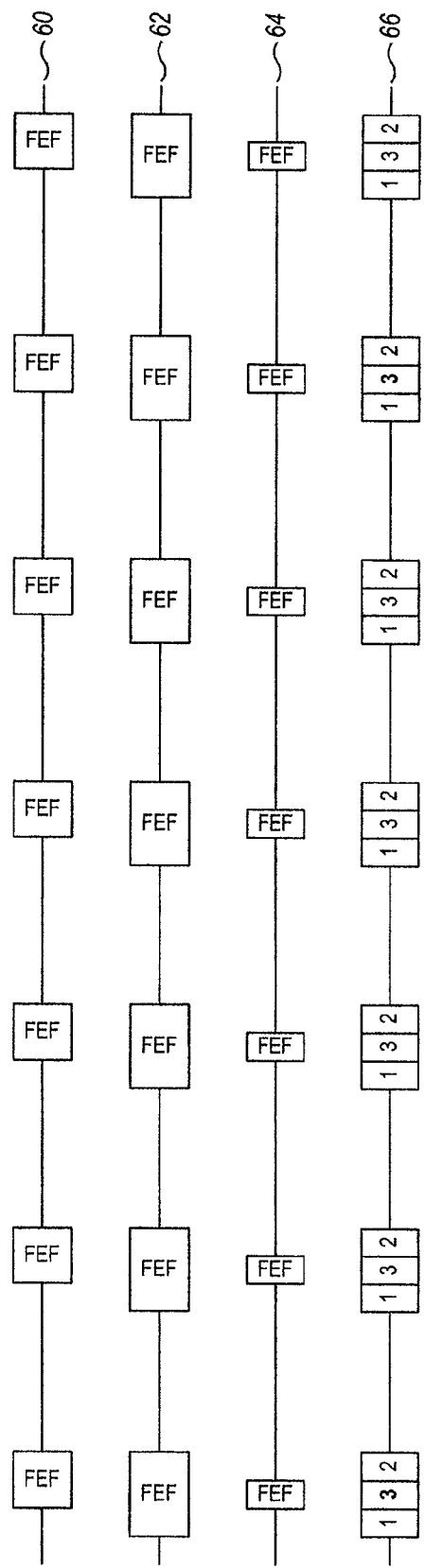
FIG. 6 is a schematic diagram showing FEF slots on three RF channels in an embodiment of the present invention.
Figure 7:
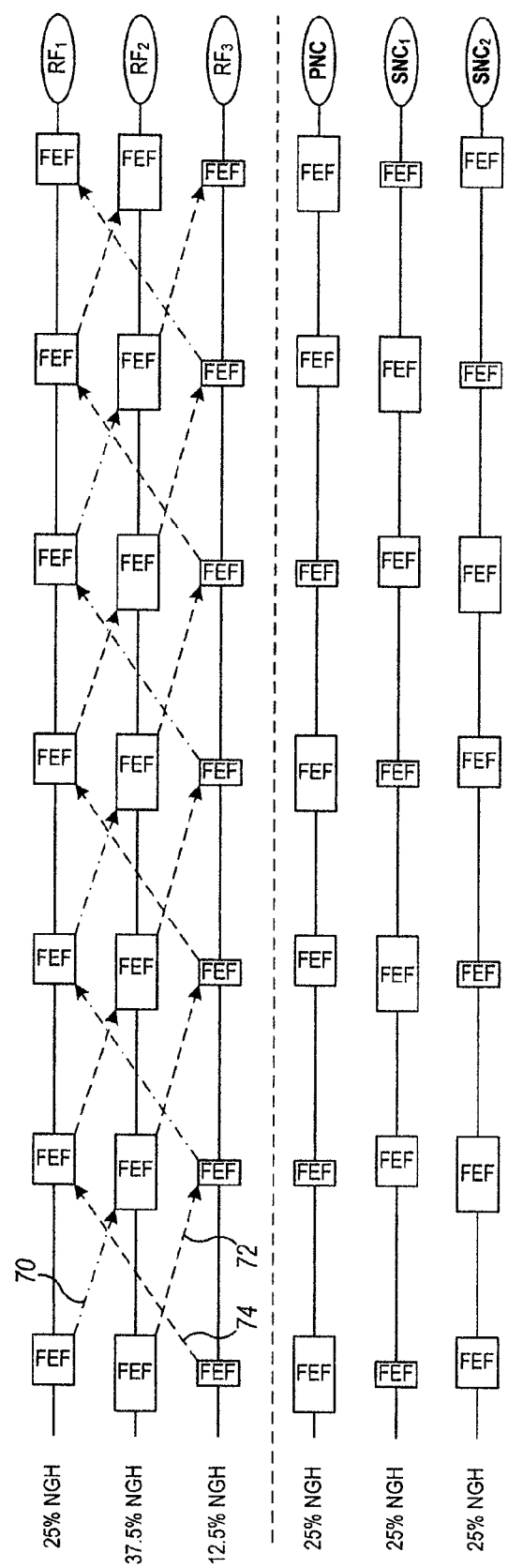
FIG. 7 is a schematic diagram showing an arrangement of three logical channels according to an embodiment of the present invention.

The number of transmitted logical channels may depend on the maximum number of additional physical slots, e.g. FEF slots, that are transmitted simultaneously. This is illustrated by FIG. 6 and FIG. 7. In FIG. 6, it can be seen that sequences of FEF slots may be available on three RF channels 60, 62, 64 and it can be seen from the lower time line 66 that there may be between 0 and a maximum '3' of FEF slots transmitted simultaneously. In other words, although the structure of the superframe used at each RF was the same in the embodiments which have been described so far, each RF has a different structure of superframe in an embodiment of FIG. 6. Under this structure, each RF may be different in the number, length and location of FEF slots allocated thereto, and each RF may be different even in the ratio of data (e.g., DVB-T2 data and DVB-NGH data) transmitted at the entire RF to data (e.g., DVB-NGH data) transmitted in FEF slots, or the ratio of DVB-T2 data to DVB-NGH data. In FIG. 7, it can be seen that three logical channels 70, 72, 74 may be formed from these FEF slots, in the frequency hopping manner illustrated. As can be seen in FIG. 7, the maximum number of logical channels is related to the number of overlapping FEF slots. Each logical channel, as described before, may form PNC and SNC.

Figure 8:
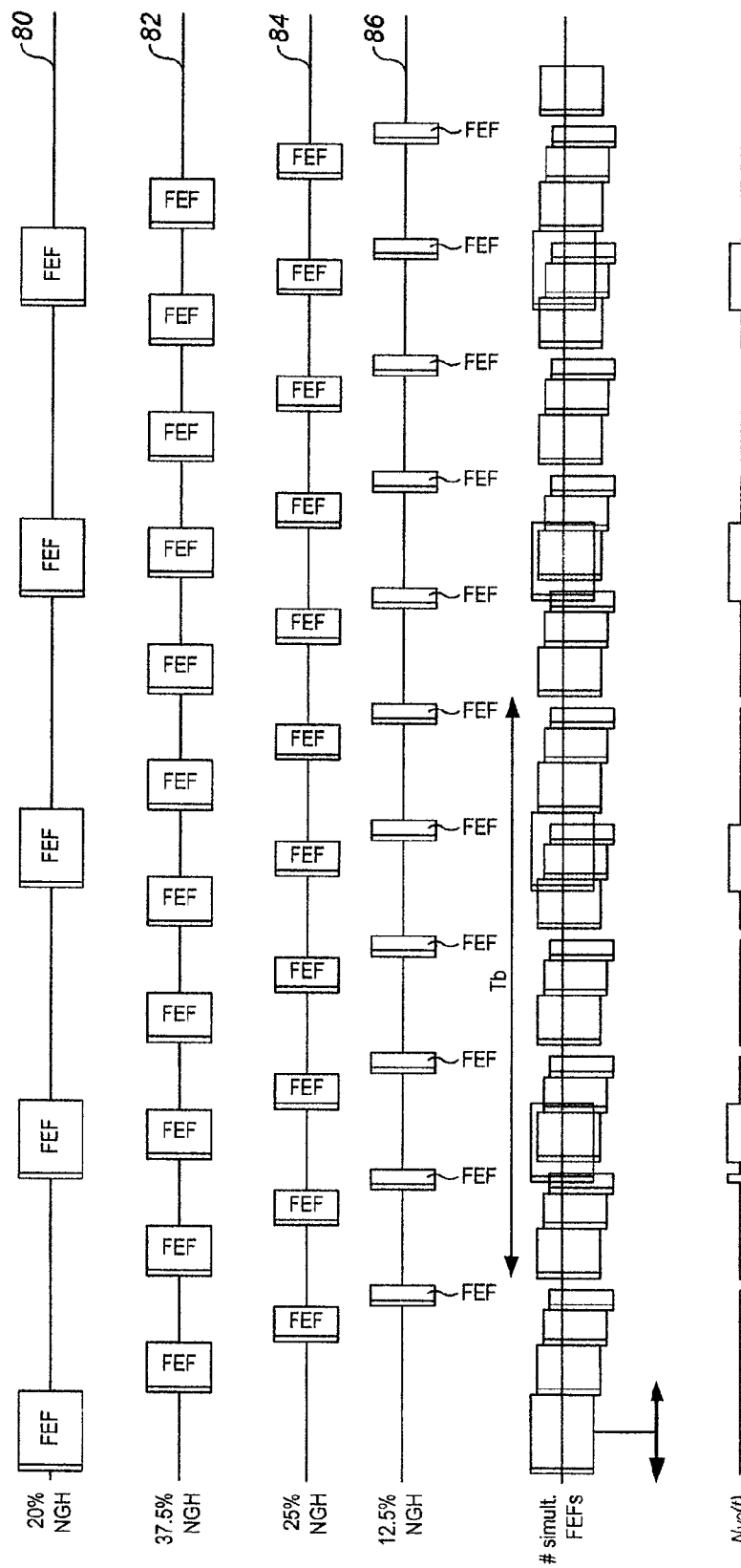
FIG. 8 is a schematic diagram showing shifting of physical slots according to an embodiment of the present invention.
Figure 9:
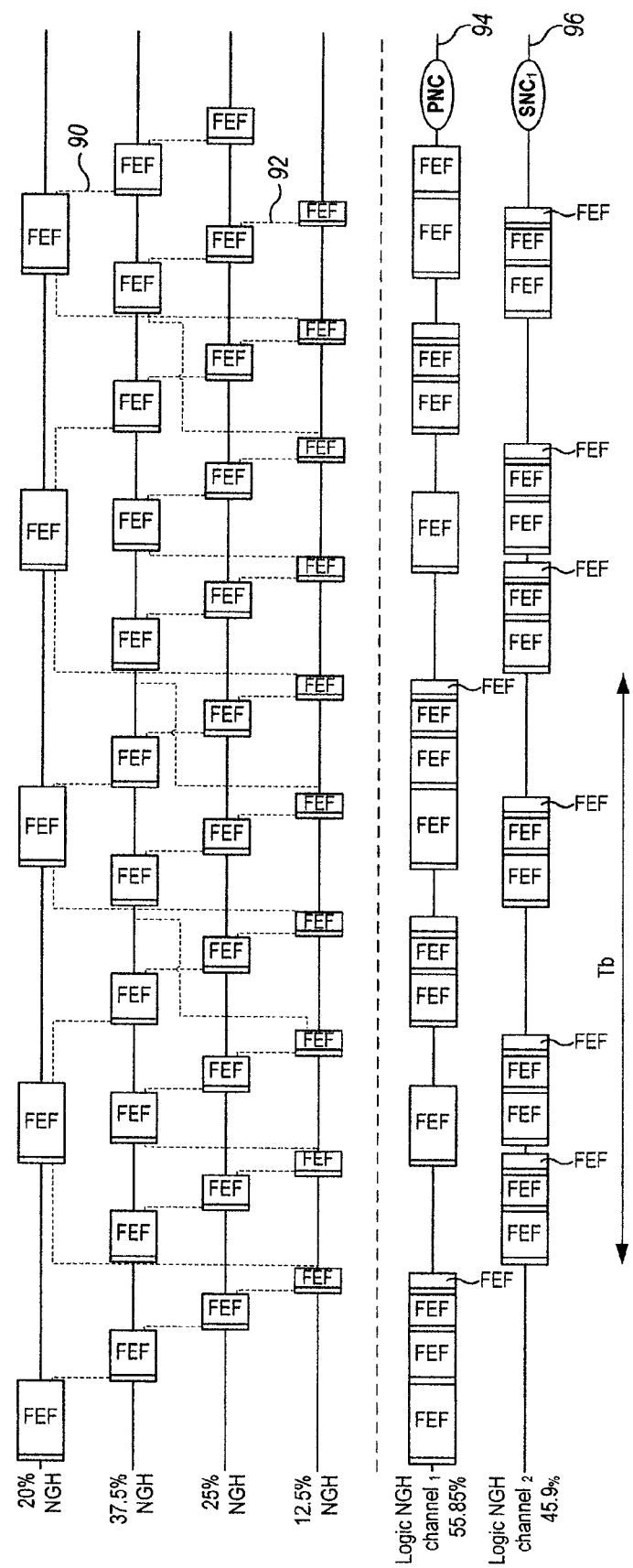
FIG. 9 is a schematic diagram showing an arrangement of two logical channels according to an embodiment of the present invention.

As illustrated by FIG. 8, timing offsets of the FEF slots on a set of RF channels 80, 82, 84, 86 may be arranged to reduce the overlap between FEF slots, so that the FEF slots are distributed more evenly in time domain, so that the capacity of each logical channel may be increased, while the number of logical channels required to make use of available additional slots may be reduced. As shown in FIG. 8, the maximum number of FEF slots transmitted simultaneously may be reduced to two by appropriate timing offsetting between the four RF channels shown, so that two logical channels 90, 92 may be formed as shown in FIG. 9, as primary 94 and secondary 96 logical channels.

Embodiments of the invention will now be described in more detail.

In prior art systems, due to the high capacity requirements of conventional DVB-T2 services intended primarily for reception by fixed receivers, including High Definition (HD) and three dimensional (3D) services, the amount of bandwidth per RF channel used for NGH is typically quite low (FEF_length<20% in most cases). In other words, the more the T2 frames to be transmitted, the less the FEFs available for transmission of DVB-NGH data, because of the large amount of data used in the conventional DVB-T2. As a result, the number of NGH services per T2 RF channel may be very low (3-5 TV and radio programs), limiting the gain achievable by Statistical Multiplexing. Additionally, the padding overhead that is introduced at the end of each frame may become more significant the shorter the frame is. In order not to affect the zapping time (time to receive a new service) of T2 services, short FEFs may be used (FEF_INTERVAL≤2). In this case, the NGH L1 signaling overhead may become quite significant. When the number of PLPs is increased, the main overhead may be caused by L1-Post signaling information (L1-config and L1-dynamic).

Embodiments of the invention address these problems by bundling data transmitted in FEF slots to provide one or more logical NGH channels. A first embodiment of the invention introduces a new frame format, as illustrated by as "Option 2" 5 in FIG. 1. A P1 symbol indicates the start of the NGH slot. Otherwise, the conventional T2 receivers may not receive T2 signals.

"Option 1" 3 in FIG. 1 represents the situation in the prior art, in which a NGH frame is transmitted within a FEF slot. In this case, a DVB-T2 frame is encapsulated within the FEF.

In an embodiment of the invention, a NGH frame is not equivalent to a FEF and is not equivalent to a DVB-T2 frame. In this arrangement, an NGH frame is not aligned with the FEF part, also referred to as a FEF slot, and the NGH signal does not have to use the full FEF; the portion where NGH signals are transmitted in the FEF part is referred to in FIG. 1 as the NGH slot. Data in FEF parts are then bundled (time-domain bundling) to form the NGH frames as shown in FIG. 1. Typically, all NGH frames may have the same number of OFDM symbols, and all frames may have the same capacity. Typically, L1-Pre is transmitted immediately after the P1 symbol. P2 symbols (which may have special pilot patterns) may be used to carry the L1-Pre information. Typically only one P2 symbol may be enough for this. As in DVB-T2, L1-Pre information may carry minimum information about the frame format, resulting in a decrease in signaling overhead of L1-Pre information. With L1-Pre information, the NGH receiver knows the start/end of the NGH physical slot, as well as when the next NGH frame is scheduled and its duration. This may simplify the detection of L1-config and L1-dynamic (L1-Pre contains a pointer to the next L1-config and L1-dynamic). Typically, L1-config and L1-dynamic may be transmitted starting at any OFDM symbol of the FEF part or NGH slot, but may not be present in the FEF part or NGH slot.

As illustrated by FIG. 3, data included in FEF parts on different T2 RF channels can be bundled (frequency domain bundling) increasing the capacity of the logical NGH channel. However, in case of overlapping FEFs, i.e., if FEF is present on multiple RFs at a certain time, only the signal included in one FEF part among the FEFs on multiple RFs may be recovered when a single tuner is used for reception. Each data service is provided by a single logical NGH channel, so that only one tuner is required to recover the service. Next, the concept of multiple logical NGH channels will be described. If there are multiple logical NGH channels, instead of signaling all the services as proposed with Time Frequency Slicing (TFS), which may cause excessive overhead, one logical NGH channel may be selected as Primary NGH Channel (PNC) and the rest as Secondary NGH Channel (SNC). In an embodiment of the invention, L1-Pre contains information about in which RF the primary NGH channel is carried. L1-config is mapped onto to the primary channel and at the beginning of each superframe in each secondary channel. L1-dynamic may be mapped to all logical channels but may contain only the signaling for the services carried by such logical NGH channel. The primary NGH channel may then be responsible for providing the fast zapping and acquisition, and may be considered the entry point to any service transmitted in any of the secondary NGH channels. If only one tuner is required at the receiver side, the bandwidth assigned to one logical NGH channel is typically not higher than that of a T2 RF channel.

In embodiments of the invention, the FEFs may be bundled, and this may be signalled in various scenarios as follows:

(1) Firstly, a single T2 RF channel may be used, and any T2 superframe structure may be used (FIG. 2). Alternatively, multiple T2 RF channels may be used. In this case, there may be several options as follows. (2) All RF channels of multiple T2 RF channels may have the same T2 superframe structure, and a single logical NGH channel may be provided (FIG. 3). (3) All RF channels of multiple T2 RF channels may have the same T2 superframe structure, and multiple logical NGH channels may be provided (FIG. 4). In each of the above cases, the T2 frame length and FEF interval may be flexible and may be adapted to provide an optimum configuration of the NGH channel.

As a further alternative, (4) different T2 superframes structures may be provided among multiple T2 RF channels and multiple logical NGH channels (FIGS. 6 to 9). In this case, the degree of freedom for logical channels may be acquired by time shift in the T2 superframes. If only the NGH signal independent of T2 transmission is transmitted, the NGH slots can be chosen freely, also introducing FEF parts within the NGH signal.

FIG. 2 illustrates the case of a single T2 RF channel. In this case, FEF bundling operates only in the time domain. In this case, no constraints may be required on the existing T2 signal.

In the case of multiple T2 RF channels as in FIG. 3, with the same T2 superframes structures in all T2 RFs and single logical NGH channel, the case may represent the simplest scenario for frequency domain-considered FEF bundling over multiple T2 RF channels. In order to bundle all T2 RF channels in a single logical NGH channel, the condition of following Equation (1) should be met:

$$N_{RF}(T_{SLOT}+T_{SW}) \leq (T_{FEF}+FEF\_INTERVAL \times T_F) \qquad (1)$$

where $T_{SW}$ is the time required by the receiver to tune to a new frequency. $N_{RF}$ is the number of RFs, and $T_{SLOT}$ and $T_{FEF}$ are a length (time) of SLOT and a length (time) of FEF, respectively. FEF_INTERVAL is the number of T2 frames between two FEFs, and TF is a length (time) of a T2 frame. The maximum logical NGH channel capacity (bit rate) may be achieved when both sides of the expression are equal.

In the case of multiple T2 RF channels, with the same T2 superframes structures in all T2 RFs and multiple logical NGH channels, when previous condition is not met, it may be inferred that during some intervals two NGH slots are simultaneously allocated to T2 RF channels or not enough time is available to switch between frequencies. In order to require only one tuner at the receiver, embodiments of the invention may employ multiple logical NGH channels. In the case of multiple logical channels, the previous condition may be updated to Equation (2) below:

$$N_{RF}(T_{FEF}+T_{SW}) \leq N_{LNC}(T_{FEF}+FEF\_INTERVAL \times T_F) \qquad (2)$$

where $N_{LNC}$ is the number of logical NGH channels ($1 \leq N_{LNC} \leq N_{RF}$).

FIG. 5 illustrates the case of multiple T2 RF channels, with the same T2 superframes structures in all T2 RFs and multiple Logical NGH channels.

FIG. 6 illustrates the case of Multiple T2 RF channels, with different T2 superframes structures among T2 RFs and multiple logical NGH channels.

In this more general case, NGH percentage bandwidth (BW %) may be different across T2 RF channels, with different superframe structures (i.e. T2 frame length, FEF interval and FEF length) and non-synchronized T2 RFs. In this case, as illustrated by FIG. 6, the number of multiple logical NGH channels $N_{LNC}$ may be computed as the maximum number of overlapping FEFs, for example $N_{LNC}=3$ in FIG. 6.

FIG. 7 illustrates the case of multiple T2 RF channels, with different T2 superframes structures among T2 RF channels and multiple logical NGH channels, as in FIG. 6. Typically, the first logical NGH channel to be allocated is the PNC 72. A main function of the PNC may be to enable fast zapping, therefore, the PNC may be the logical channel with the largest capacity. This may also help to compensate the additional overhead of the PNC. In the example of FIG. 7, the FEFs are assigned to the PNC in a way that the frequency diversity gain is maximized (PNC may use all RF frequencies). In other embodiments, in order to allocate FEFs, other criteria may be used. For example, increased robustness for the PNC (e.g. allocating a lower frequency to PNC) may be other criteria, and the PNC may be allocated to a single RF to avoid switching between channels. A lower difference in frequency between consecutive FEFs, overhead, etc. may be other criteria. In an embodiment of the invention, after the PNC has been allocated, remaining FEFs are allocated to the SNC(s). Multiple combinations may be possible as long as the minimum switching time between RF carriers is guaranteed. In the example of FIG. 7, FEFs are connected in order to average the bit rate between logical NGH channels and also to increase frequency diversity thanks to frequency hopping, but other criteria could be introduced, in a similarly manner as for the PNC allocation.

In the previous example, the FEFs on different RF channels occur mostly simultaneously (i.e. $N_{LNC} \rightarrow N_{RF}$). In an embodiment of the invention, the T2 superframes may be shifted to reduce the number of logical NGH channels, increasing the capacity of each logical NGH channel. Increasing the capacity of each NGH carrier may increase the potential gain of statistical multplexing. Since the superframe format from each RF is known, the period of the multiple logical NGH channel set may be computed. This period $T_b$ is useful since optimisation algorithms may work with that span.

FIG. 8 illustrates an algorithm to bundle the FEFs as an embodiment of the invention. In this case, there are multiple T2 RF channels and multiple logical NGH channels, and the multiple TF RF channels have different T2 superframe structures. The following algorithm may be employed to obtain the shift to be applied to each RF.

(1) A guard time is inserted before each FEF. This guard time is determined taking into account the tuning time, which is time required for the tuner to start decoding of the data transmitted on the switched RF channel after switching the RF frequency. This guard time is represented by the black boxes in FIG. 8.

(2) The RF channels may be sorted according to the FEF length from the largest FEF to the shortest FEF. In case of equal FEF length, the RF with the largest FEF_INTERVAL is placed first.

(3) For a given FEF (e.g., the first FEF in the superframe), each $i^{th}$ RF may be shifted so that the given FEF is transmitted after the FEF of the (i−1)-th RF.

(4) The number of simultaneous FEFs $N_{LNC}(t)$ is obtained. At a first point in the algorithm, for the highest value of $N_{LNC}(t)$, it is referred as $n_{LNC}$, and the overlapping FEFs $N_{OV}$ are obtained. The $N_{OV}$ overlapping FEFs are sorted from longer FEFs to shorter FEFs. The longest $N_{ov}$-1 FEFs among the sorted FEFs are then evaluated for shifting. The shifting will be carried out if the max($N_{LNC}(t)$) after shifting is less than max($N_{LNC}(t)$) before shifting. If $n_{LNC}$ is reduced, the next step is to go to said first point in the algorithm. If not, then the end of the algorithm may be reached. In other words, a process is repeated, which includes calculating the number of FEFs overlapping in the time domain, shifting the remaining FEFs except of the shortest FEF to reduce the calculated number of overlapping FEFs, and shifting once again the remaining FEFs except for the shortest FEF among the shifted FEFs.

As a result, the FEFs may be mapped to the resulting logical NGH cannels as illustrated in FIG. 9. It can be seen that, as previously discussed, FEFs are mapped to a PNC and SNC(s). Due to the shifts applied, several adjacent FEFs may be mapped to the same PNC/SNC. This may be beneficial in terms of power consumption since the FEF may be transmitted/received for each PNC/SNC as bursts. In an embodiment of the invention, the FEFs are assigned to the logical NGH channels such that the differences in bit rate between the logical NGH channels are minimized while maximizing the number of explored RF frequencies is maximized (i.e. higher frequency diversity). The final FEF mapping may be signalled in the L1-config transmitted in the PNC.

Figure 10:
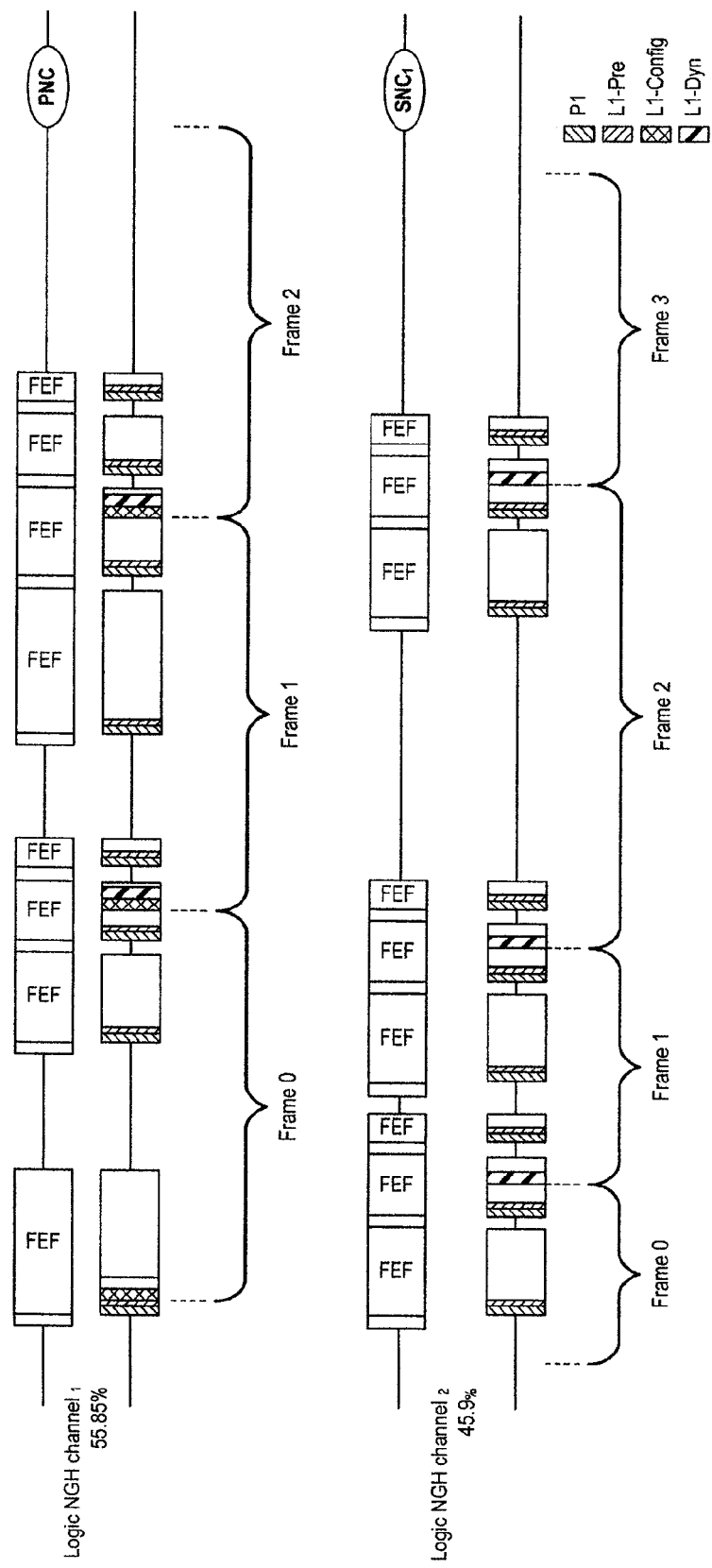
FIG. 10 is a schematic diagram showing NGH frames in an embodiment of the present invention.

FIG. 10 illustrates how the NGH frames may be defined. In this example, NGH frames are defined in terms of the number of OFDM symbols in each NGH frame, which is constant for all the NGH frames in one NGH superframe. The NGH frame capacity may be kept constant from NGH frame to NGH frame, however, due to the bursty nature of the transmission, there may be variations on the instantaneous throughput. However, different logical NGH channels may have different number of OFDM symbols per frame. In the PNC, L1-config and L1-dynamic are typically transmitted at the beginning of each NGH frame, whereas in the SNCs, typically L1-config and L1-dynamic are transmitted at the beginning of a first NGH frame of the superframe and only L1-dynamic is transmitted at the beginning of the remaining NGH frame, except for the first NGH frame of the superframe.

Figure 11:
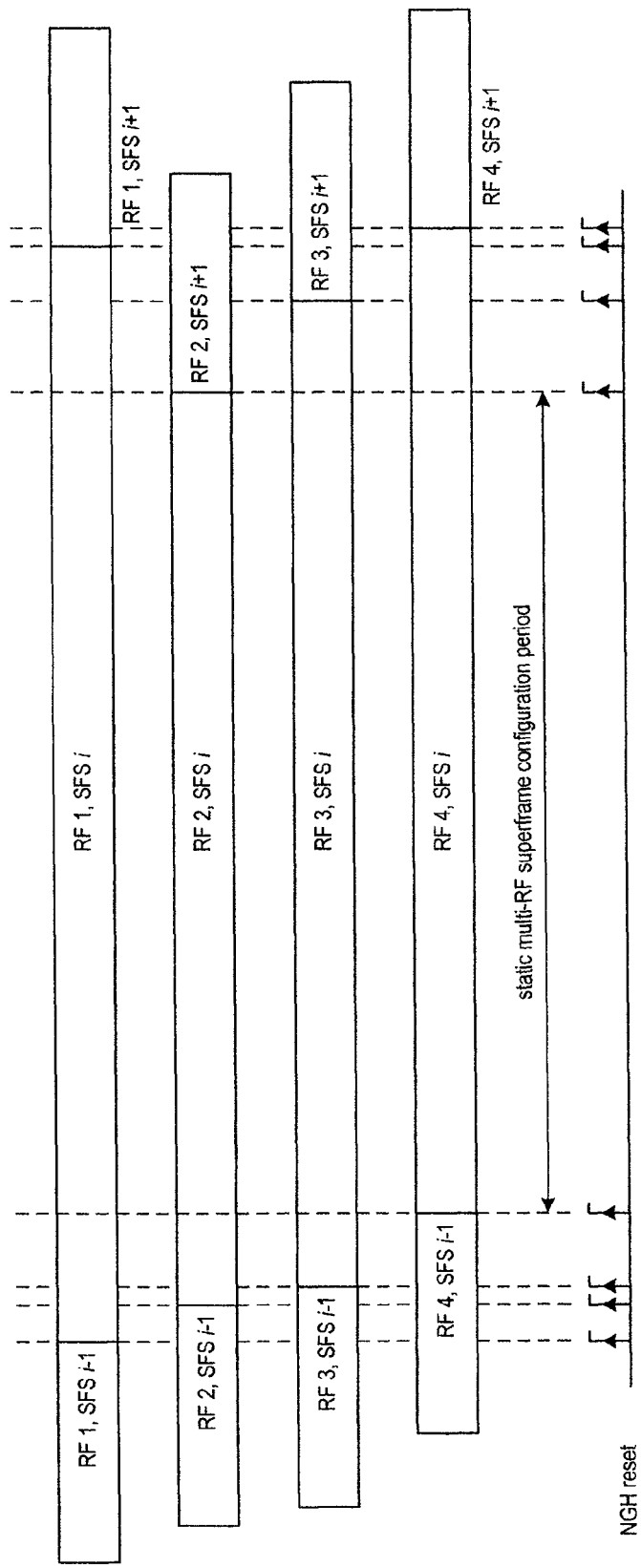
FIG. 11 is a schematic diagram showing the alignment of NGH superframe configuration and T2 superframe configuration in an embodiment of the present invention.

FIG. 11 illustrates how the NGH superframes and T2 superframes may be aligned. A change in NUM_T2_FRAMES, NUM_DATA_SYMBOLS, FEF_LENGTH, or FEF_INTERVAL creates a new superframe structure (hereinafter, the superframe structure may be abbreviated as SuperFrame Structure (SFS)). Since FEF-bundling operates based on the structures of the existing multiple T2 RF channels, any change in the structure of the T2 RF channels causes a change in NGH configuration, making it necessary to reconfigure the NGH configuration. Each reconfiguration may need to be signalled and propagated to all the receivers. For this fast reconfiguration, L1-Pre may allow L1-config and L1-dynamic in any logical NGH channel (PNC and SNC). This option may be used during SFS reconfiguration avoiding possible micro-cuts in case the receivers had to switch to PNC and then came back to the SNC. However, these changes do not happen frequently, and are usually scheduled during late hours to minimize the impact at the receivers. Therefore, the extra signaling required may be negligible. Apart from this possible limitation, NGH superframe may be defined freely.

In existing T2 signaling, the signaling fields that determine the frame structure (and the FEF length) are included L1-Pre signaling and L1-Post signaling, and the L1-Post information includes L1-config information and L1-dynamic information. The signaling fields that determine the frame structure in the DVB-T2 transmission system include NUM_T2_FRAMES (the number of T2 frames per superframe) and NUM_DATA_SYMBOLS (the number of OFDM symbols per T2 frame), which are transmitted in L1-Pre, and include FEF_LENGTH (length of FEF) and FEF_INTERVAL (the number of T2-frames between two FEFs), which are transmitted in L1-Post. In the present invention, to transmit NGH data in FEF, part or all of the signaling fields should be changed, added or deleted.

FIG. 12 illustrates an example of signaling information included in L1-pre in an embodiment of the invention. As illustrated in FIG. 12 as an embodiment of the invention for NGH, under the proposed frame structure in which the T2/NGH frame is transmitted after being multiplexed on the same frame structure, it may be efficient to signal the frame structure in a single field (i.e., L1-Pre). This may be achieved by transmitting information such as interval between FEFs, interval between NGH slots and the number of OFDM symbols per NGH frame, in L1-Pre. For example, NGH_SLOT_INTERVAL transmitted in L1-Pre indicates an interval between two consecutive NGH slots. The longest interval may be obtained when FEF_INTERVAL=256 and the longest frame length is used (250 ms), and in this case, the longest NGH_SLOT_INTERVAL may be given as 64 seconds. The NGH_SLOT may be limited to 250 ms. The number of OFDM symbols per NGH frame may also be also signalled, and information about the number of symbols may be transmitted in the NUM_SYMBOLS_NGH_FRAME field of L1-Pre. L1-Pre may indicate the position of the next L1-config and L1-dynamic (the start position of next NGH frame). The position information may only be necessary during the initial scanning or zapping. L1-Pre may also be used to transmit information (PNC_RF_FREQUENCY) about the RF of the Primary Logical NGH Channel (PNC) that is present closest. This may inform a receiver of the position of L1-config during initial scanning or zapping of the transmitter. The position of L1-config should be informed for decoding of desired service mapped to PNC/SNC.

FIG. 13 illustrates an example of signaling in L1-config in an embodiment of the invention. In L1-config, the number of associated RF channels as well as the number of logical NGH channels (NUM_LNC) is indicated. In L1-config, the T2_frame/NGH slot structure for every T2 RF is signalled and transmitted. The shift between first FEFs of each T2 superframe may be known in the NGH_SLOT_OFFSET field existing in a loop for each RF. This loop provides information to make it possible to know the T2 superframe structures of all associated T2 RF channels. A second loop signals how the FEFs are mapped to the logical NGH channels (only one cycle is signalled, and the number of cycles per superframe is an integer number). Each PLP is then assigned to one logical NGH channel. In this example, since NGH frames are not aligned with the FEFs, the FIRST_FRAME_IDX refers then to the first NGH frame, not to the first NGH slot. In the case that FEF bundling is not used, L1-config remains close to prior art (DVB-T2, etc.) signaling, so that there may be little or no overhead.

FIG. 14 illustrates an example of signaling in L1-dynamic and Inband Signaling in an embodiment of the invention. RF_IDX field is no longer needed in L1-dynamic. This is because reach Physical Layer Pipe (PLP) is allocated to one logical NGH channel, and this information has already been transmitted in L1-config information. Note that RF_IDX field is replaced by SLOT_IDX. SLOT_IDX may allow the receiver to know in which position of the FEF bundling sequence is, and therefore, knowing the SLOT(s) that will be used by each logical NGH channel in the future. In the case of SNC with the different components mapped into different PLPs, the whole set of PLPs should be mapped to the same logical NGH channel so that only one tuner may be required.

Figure 15:
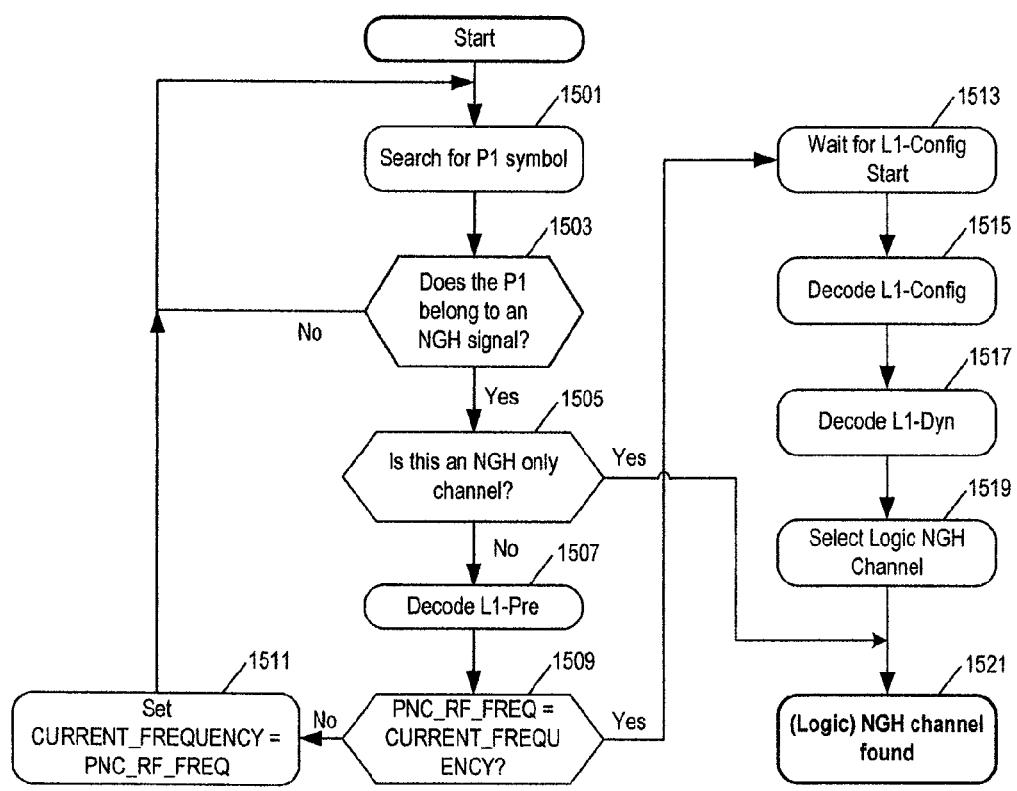
FIG. 15 is a flow diagram showing a receiver in an embodiment of the present invention.

FIG. 15 is a flow chart showing the operation of a receiver in an embodiment of the invention, showing steps at the receiver to discover the logical NGH channels and their structure. This process may be carried during initial scanning or zapping when the structure of the target logical NGH channel is unknown or during changes in the superframe structure.

Referring to FIG. 15, a receiver searches a received signal for a P1 symbol and decodes the P1 symbol in step 1501, making it possible to determine if the frame is an NGH signal. For example, if an S1 field made of 3 bits of a P1 symbol has a specific value, it is possible to determine whether an FEF, to which the P1 presently belongs, is transmitting an NGH signal. Time and frequency synchronization of the receiver and synchronizations for the frame boundary are obtained in the P1. If it is determined that the P1 is not an NGH signal, the receiver returns to step 1501. However, if it is determined that the P1 is an NGH signal, the receiver determines in step 1505 whether the NGH signal is an NGH-only channel. If it is an NGH-only channel on which the T2 signal and the NGH signal are not transmitted together but only the NGH signal is transmitted, the receiver finds a logical NGH channel in step 1521. In the case of the NGH-only channel, all of its channels have NGH data because T2 signals are not transmitted together. So, this channel is not expressed as a logical NGH channel, but may be expressed as an NGH channel only. However, if it is not an NGH-only channel, the receiver decodes L1-Pre in step 1507, and determines in step 1509 whether the RF position PNC_RF_FREQ where PNC exists is the current frequency. In other words, the receiver determines whether PNC exists in the current frequency. If PNC_RF_FREQ is not the current frequency, the receiver sets the current frequency to PNC_RF_FREQ in step 1511, and returns to step 1501. In other words, to receive an RF signal where PNC exists, the receiver sets the current frequency to PNC_RF_FREQ, and receives the RF signal.

However, if PNC_RFF_REQ is the current frequency in step 1509, the receiver waits L1-config to start in step 1513. If L1-config starts, the receiver decodes L1-config and L1-dynamic in sequence in steps 1515 and 1517, obtains information (e.g., NGH_SLOT_INTERVAL, NUM_SYMBOLS_SLOT, NGH_SLOT_OFFSET, LNC_SLOT_PERIOD, RF_IDX, etc.) about a configuration of the logical NGH channel in step 1519, and then finds a (logical) NGH channel on which the desired service is transmitted, in step 1521.

Figure 16:
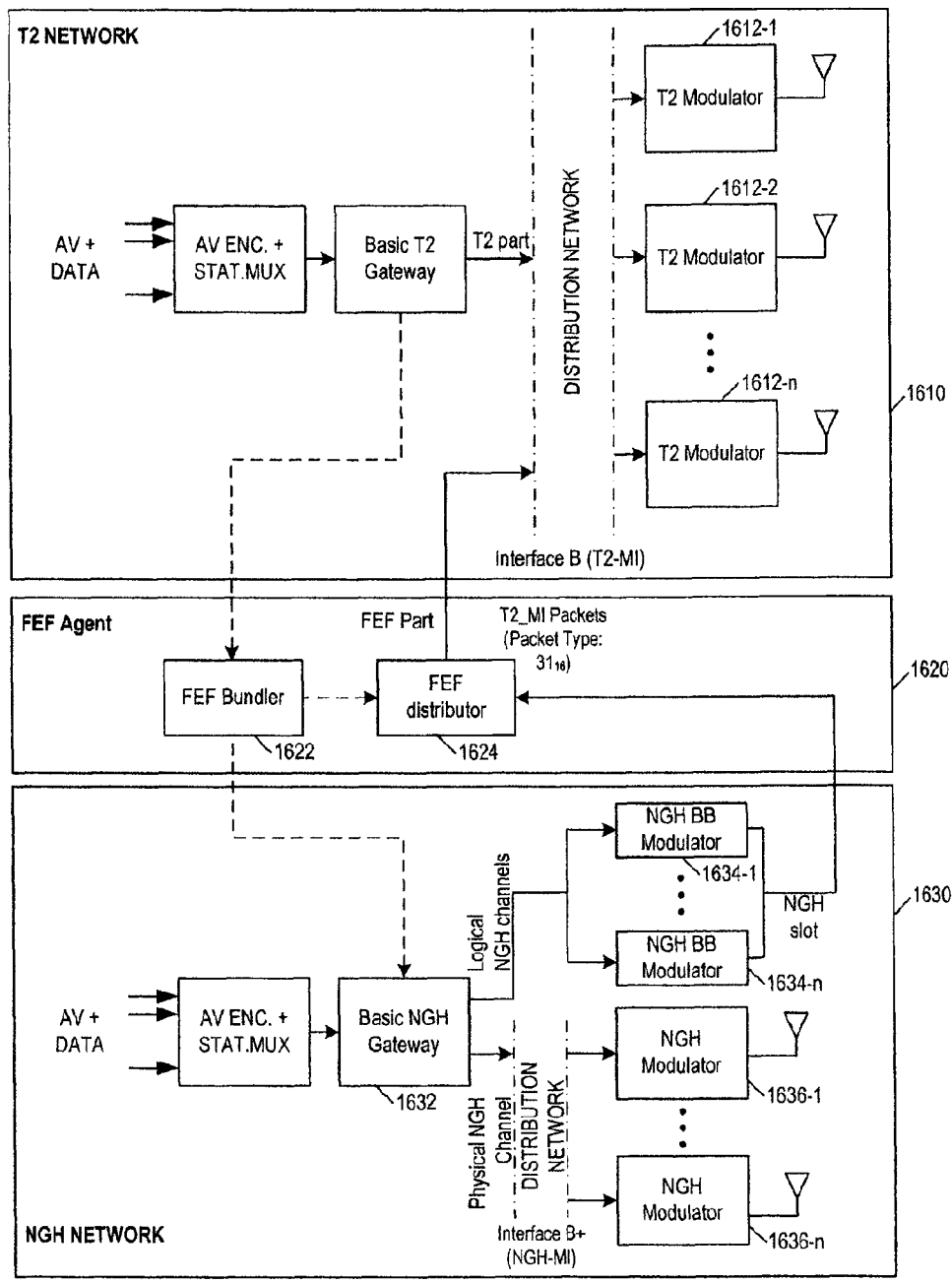
FIG. 16 is a schematic diagram showing a network and transmitter architecture in an embodiment of the present invention.

FIG. 16 illustrates a network and transmitter architecture as an embodiment of the invention. The network and transmitter architecture in FIG. 16 includes a T2 network 1610, an FEF agent 1620, and an NGH network 1630. In realization, the FEF agent may be included in a separate processor or an existing processor on the NGH network or the T2 network. Physically, the NGH network may be configured as one physical entity by being combined with the existing T2 network. The T2 network 1610 in FIG. 16 is not so different in architecture from the existing T2 network and transmitter, so its description will be omitted.

In this embodiment, at least two new elements are introduced: the FEF bundler 1622 and FEF distributor 1624. The FEF bundler 1622 may be in charge of creating the logical NGH channels and assign the FEFs to the logical NGH channels. The FEF bundler 1622 may assign the physical slots to the logical channels according to an embodiment of the present invention. An input of the FEF bundler 1622 may be the superframe configuration used in T2 RF channels of the T2 network 1610. The FEF bundler 1622 may be connected to at least one NGH network 1630, but it could be connected to multiple NGH networks since the bandwidth allocation may be done by the FEF agent 1620. Once the logical channels are defined, the FEF bundler 1622 may inform the NGH gateway 1632 of the number of logical channels, the bit rate of each, the frame duration in each, which physical slots are assigned to each logical channel and the timing of each, etc. In other words, the FEF bundler is in charge of collecting information for creating logical NGH channels, and creating logical NGH channels based on the collected information.

As illustrated in FIG. 16 in an embodiment of the invention, the FEF distributor 1624 typically receives all NGH slots, and then may pad the rest of the FEF part with null data, and may send each NGH slot to the T2 modulator 1612-1, . . . , 1612-*n*. The FEF distributor may change packets to send each NGH slot to the T2 modulator, and in this case, may create T2-Modulator Interface (T2-MI) packets. The input to the FEF distributor 1624, in this example, is the IQ samples corresponding to every physical slot, and the NGH logical channel configuration defined by the FEF bundler 1622. The output of the FEF distributor 1624 may be a T2-MI packet containing the input IQ samples and adding the signaling required to address the modulator that should transmit the modulated physical slot, and the padding cells (the basic unit of OFDM resources in which the frequency and time domains are considered) in case the FEF is not fully used. The T2-MI packet may then be transmitted into the T2 distribution network 1614. In this example, NGH BB modulators 1634-1, . . . , 1634-*n* generate a BB NGH signal and NGH modulators 1636-1, . . . , 1636-*n* generate a RF NGH signal transmitted in NGH-only RF channels. This allows reusing a part of the T2 modulator 1612-1, . . . , 1612-*n* in charge of upconverting the FEF IQ cells to the corresponding frequency. This may help decreasing the cost of the NGH network, in particular when the NGH signal is transmitted in the FEF part.

Figure 17:
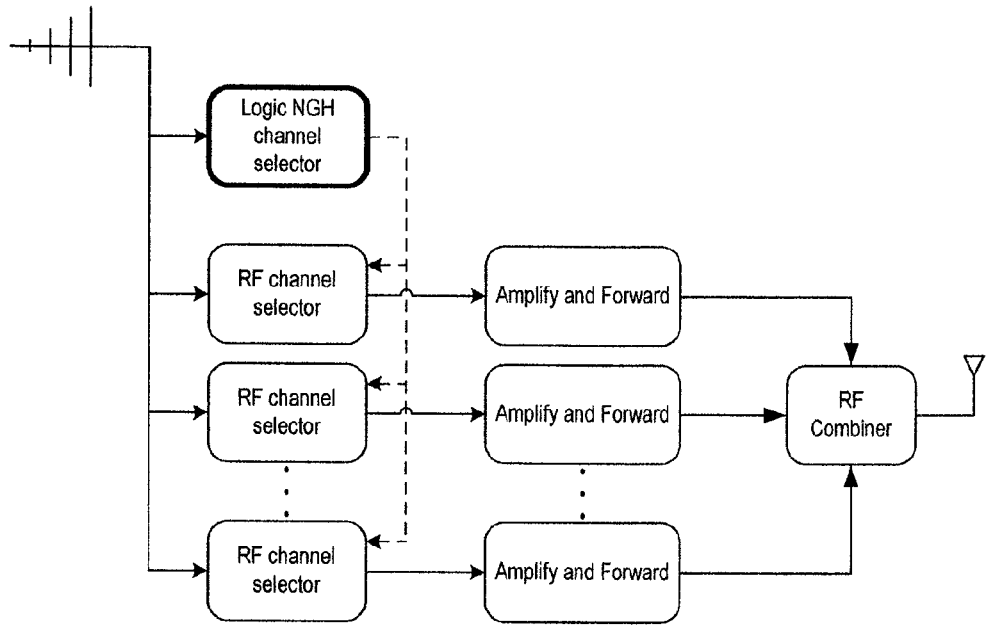
FIG. 17 is a schematic diagram showing a repeater in an embodiment of the present invention.
Figure 18:
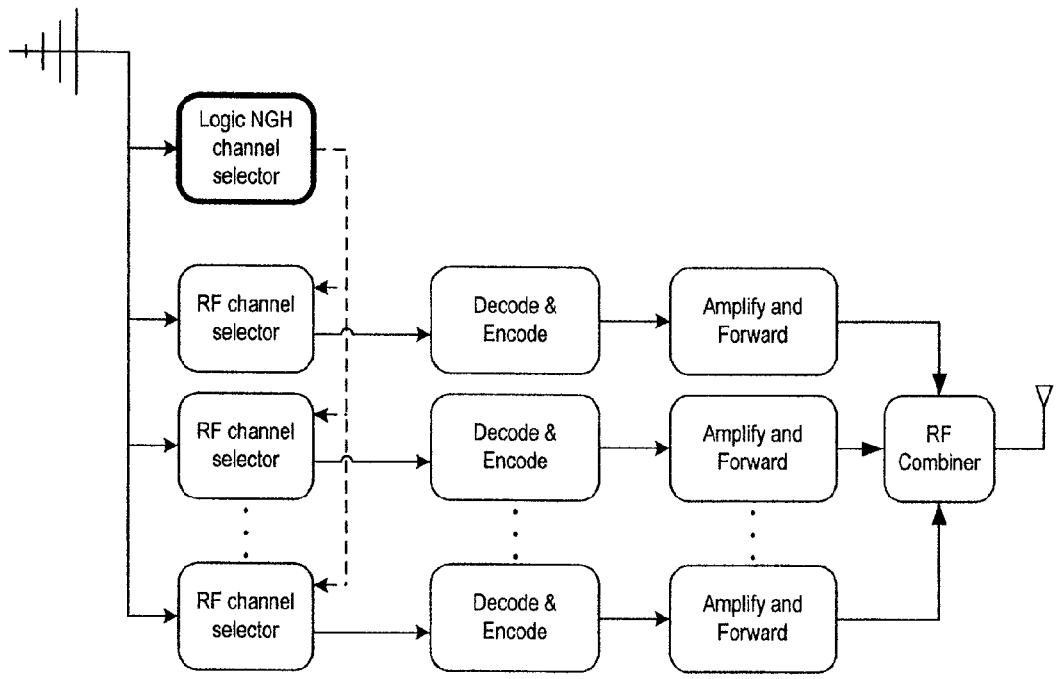
FIG. 18 is a schematic diagram showing a repeater in an embodiment of the present invention.

FIG. 17 and FIG. 18 illustrate examples of repeaters, gap fillers or receivers in an embodiment of the invention. Amplifying the T2 signal may be a waste of power in situations where it is primarily the NGH coverage that need to be improved (e.g. in indoors, tunnels, public transport, etc.), since for conventional fixed receivers, the T2 signal may typically be received from roof-top antennas with much better reception conditions. In an embodiment of the invention, a potentially much more efficient scheme is provided where the signal that is repeated is only the NGH signal. This may be achieved if the repeaters operate on a logical NGH channel basis. Since NGH slots of a logical channel may occur more frequently than FEF parts of a single T2 signal, the repeater may operate more continuously (less gaps between bursts). The number of tuners required by each repeater may be reduced since $1 \leq N_{LNC} \leq N_{RF}$ (i.e. one tuner per logical NGH channel). As illustrated by FIG. 17, an additional module (logical NGH channel selector) may be in charge of retrieving the L1 signaling related to each logical NGH channel that needs to be repeated. The L1 signaling is then used to switch between the FEFs forming the logical NGH channel. An independent amplify and forward RF chain may be required for each logical NGH channel that is repeated. As illustrated by FIG. 18, in case of a more advanced repeater, the NGH signal may be decoded before forwarding it to the receivers (a so-called Decode-Amplify-Forward scheme). However, since decoding the signal may introduce a greater delay, the restored NGH signal may be transmitted in a different frequency to avoid interference to the original RF channel. For the same reasons previously explained in relation to the temporal overlapping of the logical NGH channel, each NGH channel should be transposed to a different frequency. If FEFs in which NGH signals are transmitted are transmitted only on one RF, a single RF channel selector instead of multiple RF channel selectors may be sufficient.

Although not illustrated, if the amplifying and forwarding units, the RF combiner, and the antenna are excluded from the structure of the repeater and gap filler shown in FIGS. 17 and 18, it is a structure of a receiver for receiving signals transmitted under the structure of the present invention. In other words, the receiver obtains information about FEFs in which NGH signals are transmitted, by means of the logical NGH channel selector, selects an RF channel on which the FEFs are transmitted, by controlling the RF channel selector based on the information, and decodes NGH signals transmitted in FEFs by means of the decoding unit partially shown in FIG. 18, finally obtaining NGH signals. Also, although not illustrated, if the FEFs, in which the NGH signals are transmitted, are transmitted only on one RF, a single RF channel selector instead of multiple RF channel selectors may be sufficient.

As has been described, FEF bundling may tie together FEFs both in time and frequency domains, and this may have benefits including the following. In case of a single RF, FEF bundling may help to reduce the L1 overhead since FEF length and NGH frame duration independent, and may provide a gain in terms of time diversity. In case of multiple RF, FEF bundling may also help to reduce the L1 overhead since FEF length and NGH frame duration may be independent since L1 Config may only be transmitted in the PNC (SNC only on the first frame of the superframe). FEF bundling may reduce the zapping time and FEF bundling may simplify the mapping of the services since a single large capacity NGH channel is seen, so that more services may be multiplexed increasing the statistical multiplexing gain. If FEF bundling works over multiple RF carriers, frequency hopping may bring additional frequency diversity, with gains up to 4 dB or more in case of indoor or low mobility scenarios. FEF bundling of the invention may not impose any constraint to the T2 signal (e.g. minimum FEF length/NGH bandwidth), nor degrade the T2 receiver's performance (e.g. zapping time). Since no synchronization is required between the T2 RF signals, FEF bundling may be used even when the T2 RFs are operated by different broadcasters and the T2 RF could be transmitted from different sites.

In an embodiment of the present invention, a different approach to different signaling from some aspects of embodiments described already will be described.

The concept of logical NGH channels typically defines logical NGH channels (LNCs) including logical frames that are mapped onto physical resources available in DVB system multiplex. The physical resources may be referred to as additional physical slots, each of which is a time slot in RF frequencies and has its own bandwidth. So, one RF frequency will have its own configuration in terms of the time slot and a period of the bandwidth. Different configurations may be applied to different RF frequencies at one RF frequency. LNCs may be mapped to physical resources, and a process thereof is known as scheduling. This mapping is typically dynamic, though it may be static in certain cases. The static case may correspond to, for example, a case where the same configuration of the time slot period and bandwidth is applied to all RF frequencies and slots of the RF frequencies are synchronized, i.e., aligned in time.

This dynamic mapping to the additional physical slots (e.g., physical resources) of the LNCs may be signalled by information about LNC that may include physical slots of a first sequence, in L1 signaling. The L1 signaling typically includes two parts: L1-Pre (typically with a fixed length, i.e., fixed field size) and L1-post (typically with a variable length), and may be transmitted in a separate signaling section. In this case, it may be called out-of-band signaling or out-of-band type signaling. In addition, only the dynamic information about signaling of a desired PLP in the next frame may be transmitted based on the in-band signaling, i.e., the signaling information included in the data PLP of the current frame. Typically, sending signaling data together with data is called in-band signaling or in-band type signaling.

The L1-Pre part is fixed in length and value, for a given superframe. In an embodiment of the present invention, logical frames may be dynamically mapped to slots and the fixed length of L1-pre may be preserved, but values of some mapping-related fields are subject to change. In an embodiment of the present invention, a receiver determines that some fields may vary, without considering that L1-pre is a mere repetition from one frame of a superframe to another frame. As to decoding for firmly maintaining L1-pre, in an embodiment of the present invention, a soft decoding input may be set as a value indicating that the fixed part has been known for the sequence and/or superframe of physical layer slots. For example, the fixed part, if necessary, may have Log Likelihood Ratio (LLR) values which are set to infinity to ensure the better decoding performance of the variable part.

In an embodiment of the present invention, another approach to signaling is to signal the start of logical frame that may be a Logical NGH Frame (LNF). As mentioned before, L1-pre part may have a variable value for some fields, and in an embodiment of the present invention, mapping-related signaling may be done in L1-pre rather than partially in L1-re and partially in L1-dynamic as done in other embodiments of the present invention. The signaling conveyed in data streams that may be a data section (i.e., Physical Layer Pipes (PLPs) rather than a separate signaling section, is called in-band signaling, and the in-band signaling may be used by copying the L1-pre signaling. In addition, signaling for PLP carrying in-band signaling may not be limited.

For example, signaling including information about physical slots of a first sequence such as a logical channel may include the following signaling in an embodiment of the present invention, which is typically carried in both a first part of a preamble of each additional physical slot such as L1-Pre and an L1-Post part such as L1-dynamic. A signaling element L1_OFFSET_TIME for signaling the number of cells between L1-pre (a) and L1-post (b) exists in L1-Pre signaling. The L1-post (b) may be one associated with the next logical frame, if no L1-post signaling exists in an NGH slot where the L1-pre (a) exists. In this signaling element, for example, 0xFFFF may mean that L1-post does not exist in the current slot. L1-Pre signaling may have L1_OFFSET_FREQ that indicates the current LNC as frequency of the possible next slot. In other words, this indicates an RF frequency of the next slot carrying a frame of LNC transmitted in the current slot. L1-dynamic signaling has LNC_WINDOW indicating the number of slots mapped to LNC before being signalled. Typically, this is for all LNCs in the system. L1-dynamic signaling may also have a signaling element T_DELTA indicating a slot allocated to the last/previous slot that is signalled again for all LNCs in the system. In-band signaling may include a signaling element PLP_LNC_WINDOW for signaling the number of slots that are mapped to LNC and signalled. The in-band signaling may include a signaling element PLP_T_DELTA indicating a slot allocated to the signalled last/previous slot. These in-band signaling elements are typically about LNC(s) related to a given PLP.

In an embodiment of the present invention that uses another access to signaling, an L1-Pre part may have an information element similar to L1_OFFSET_TIME as described in connection with the previous embodiment, and this may be re-named as L1-OFFSET_NOF_CELLS, which signals the number of cells between L1-pre and L1-post. Again, 0xFFFF may mean that L1-post does not exist in the current slot. L1-Pre part may also have an information element similar to L1_OFFSET_FREQ, which may be re-named as LNC_OFFSET_FREQ, which signals a frequency of the next slot that will carry the current LNC. In addition, an L1-Pre part may have an information element LNC_OFFSET_DELTA indicating a gap between the current slot and the next slot carrying a frame of the current LNC. In an embodiment of the present invention, LNC_WINDOW and T_DELTA signals are not included in L1-dyn as mentioned in connection with the previous embodiments. This is because these are not typically required. In an L1-Pre part of a physical slot, signaling elements, e.g., signaling fields, give the receiver an access to the time and frequency coordinates of the next slot carrying the start of the same current and next LNCs. So, dynamic mapping of the current LNC will be signalled slot by slot in L1-Pre, and typically specific signaling is not required in L1-dynamic. In-band signaling may include an information element PLP_LNC_OFFSET_FREQ for signaling frequency of the next slot that will carry the current PLP in the current LNC, and an information element PLP_LNC_OFFSET_DELTA for signaling the relative time in the T periods as the next slot that will carry the current PLP in the current LNC. The signaling information elements of the in-band signaling fields may be typically identical to the equivalent elements in L1-pre, and are typically related only to each PLP in the current LNC. Typically, in the in-band signaling mode, a receiver does not continuously receive signaling in an L1-pre part.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method for transmitting data including a plurality of data streams in a wireless system, comprising:
   receiving one or more data streams;
   mapping the received data streams to an additional physical slot;
   configuring one or more frames including the additional physical slots; and
   transmitting the one or more frames at one or more radio frequencies,
   wherein the configuring comprises:
   configuring a frame including signaling information for receiving data streams mapped to the additional physical slot, and
   wherein the signaling information includes P1, L1-pre and L1-post information, and the L1-post information includes L1-config and L1-dynamic information, and
   wherein the P1 and L1-pre information is allocated in every additional physical slot.

2. A method for transmitting data including a plurality of data streams in a wireless system, comprising:
   receiving one or more data streams;
   mapping the received data streams to an additional physical slot;
   configuring one or more frames including the additional physical slots; and
   transmitting the one or more frames at one or more radio frequencies,
   wherein the configuring comprises:
   configuring a frame including signaling information for receiving data streams mapped to the additional physical slot, and
   wherein the signaling information includes P1, L1-pre and L1-post information, and the L1-post information includes L1-config and L1-dynamic information, and wherein when the one or more frames are transmitted at one radio frequency, the L1-config and L1-dynamic information is arranged at the head of each of the logical frames.

3. A method for transmitting data including a plurality of data streams in a wireless system, comprising:
receiving one or more data streams;
mapping the received data streams to an additional physical slot;
configuring one or more frames including the additional physical slots; and
transmitting the one or more frames at one or more radio frequencies,
wherein the configuring comprises:
configuring a frame including signaling information for receiving data streams mapped to the additional physical slot, and
wherein the signaling information includes P1, L1-pre and L1-post information, and the L1-post information includes L1-config and L1-dynamic information, and
wherein when consecutive logical frames form a logical channel, one or more frames are transmitted at more than one radio frequency, and there is more than one logical channel, one logical channel is set as a primary logical channel, the remaining logical channel is set as a secondary logical channel, the L1-config and L1-dynamic information is arranged at the head of each of logical frames of the primary logical channel, and the L1-dynamic information is arranged at the head of each of logical frames of the secondary logical channel.

4. The method of claim 3, wherein the logical channel includes one or more superframes, the superframe includes a plurality of frames, and the L1-config information is additionally arranged at the head of each of superframes of the secondary logical channel.

5. A method or transmitting data including a plurality of data streams in a wireless system, comprising:
receiving one or more data streams;
mapping the received data streams to an additional physical slot;
configuring one or more frames including the additional physical slots; and
transmitting the one or more frames at one or more radio frequencies,
wherein the configuring comprises:
configuring a frame including signaling information for receiving data streams mapped to the additional physical slot, and
wherein the signaling information includes P1, L1-pre and L1-post information, and the L1-post information includes L1-config and L1-dynamic information, and
wherein the L1-pre information includes any one of L1_OFFSET_TIME indicating the number of cells between L1-pre and L1-post, NGH_SLOT_INTERVAL indicating an interval between two consecutive Next Generation Handheld (NGH) slots, L1_OFFSET_FREQ indicating a Radio Frequency (RF) frequency of a next slot carrying a frame of a Logical NGH Channel (LNC) transmitted in a current slot, and LNC_OFFSET_DELTA indicating a gap between the current slot and the next slot carrying a frame of the current LNC.

6. An apparatus for transmitting data including a plurality of data streams in a wireless system, comprising:
a first gateway for mapping data streams to one or more logical channels each including one or more logical frames;
one or more first modulators for generating data to be included in each physical slot based on the logical channels;
a physical slot agent for distributing the data to be included in each physical slot to one or more second modulators; and
the one or more second modulators for modulating and transmitting a frame including the distributed physical slot data,
wherein a frame including the distributed physical slot data includes signaling information for receiving data streams mapped to an additional physical slot, and
wherein the signaling information includes P1, L1-pre and L1-post information, and the L1-post information includes L1-config and L1-dynamic information, and
wherein the P1 and L1-pre information is allocated in every additional physical slot.

7. An apparatus for transmitting data including a plurality of data streams in a wireless system, comprising:
a first gateway for mapping data streams to one or more logical channels each including one or more logical frames;
one or more first modulators for generating data to be included in each physical slot based on the logical channels;
a physical slot agent for distributing the data to be included in each physical slot to one or more second modulators; and
the one or more second modulators for modulating and transmitting a frame including the distributed physical slot data,
wherein a frame including the distributed physical slot data includes signaling information for receiving data streams mapped to an additional physical slot, and
wherein the signaling information includes P1, L1-pre and L1-post information, and the L1-post information includes L1-config and L1-dynamic information, and
wherein when the one or more frames are transmitted at one radio frequency, the L1-config and L1-dynamic information is arranged at the head of each of the logical frames.

8. An apparatus for transmitting data including a plurality of data streams in a wireless system, comprising:
a first gateway for mapping data streams to one or more logical channels each including one or more logical frames;
one or more first modulators for generating data to be included in each physical slot based on the logical channels;
a physical slot agent for distributing the data to be included in each physical slot to one or more second modulators; and
the one or more second modulators for modulating and transmitting a frame including the distributed physical slot data,
wherein a frame including the distributed physical slot data includes signaling information for receiving data streams manned to an additional physical slot, and
wherein the signaling information includes P1, L1-pre and L1-post information, and the L1-post information includes L1-config and L1-dynamic information, and
wherein when consecutive logical frames form a logical channel, one or more frames are transmitted at more than one radio frequency, and there is more than one logical channel, one logical channel is set as a primary logical channel, the remaining logical channel is set as a secondary logical channel, the L1-config and L1-dynamic information is arranged at the head of each of logical frames of the primary logical channel, and the L1-dynamic information is arranged at the head of each of logical frames of the secondary logical channel.

9. An apparatus for transmitting data including a plurality of data streams in a wireless system, comprising:
a first gateway for mapping data streams to one or more logical channels each including one or more logical frames;
one or more first modulators for generating data to be included in each physical slot based on the logical channels;
a physical slot agent for distributing the data to be included in each physical slot to one or more second modulators; and
the one or more second modulators for modulating and transmitting a frame including the distributed physical slot data,
wherein a frame including the distributed physical slot data includes signaling information for receiving data streams mapped to an additional physical slot, and
wherein the signaling information includes P1, L1-pre and L1-post information, and the L1-post information includes L1-config and L1-dynamic information, and
wherein the L1-pre information includes any one of L1_OFFSET_TIME indicating the number of cells between L1-pre and L1-post, NGH_SLOT_INTERVAL indicating an interval between two consecutive Next Generation Handheld (NGH) slots, L1_OFFSET_FREQ indicating a Radio Frequency (RF) frequency of a next slot carrying a frame of a Logical NGH Channel (LNC) transmitted in a current slot, and LNC_OFFSET_DELTA indicating a gap between the current slot and the next slot carrying a frame of the current LNC.

10. A method for receiving data including a plurality of data streams in a wireless system, comprising:
receiving one or more frames at one or more radio frequencies;
obtaining a location of an additional physical slot of each frame; and
receiving data streams allocated to the additional physical slot,
further comprising obtaining signaling information for receiving data stream mapped to the additional physical slot, and
wherein the signaling information includes P1, L1-pre and L1-post information, and the L1-post information includes L1-config and L1-dynamic information, and
wherein the P1 and L1-pre information is allocated in every additional physical slot.

11. A method for receiving data including a plurality of data streams in a wireless system, comprising:
receiving one or more frames at one or more radio frequencies;
obtaining a location of an additional physical slot of each frame; and
receiving data streams allocated to the additional physical slot,
further comprising obtaining signaling information for receiving data stream mapped to the additional physical slot, and
wherein the signaling information includes P1, L1-pre and L1-post information, and the L1-post information includes L1-config and L1-dynamic information, and
wherein when the one or more frames are transmitted at one radio frequency, the L1-config and L1-dynamic information is arranged at the head of each of the logical frames.

12. A method for receiving data including a plurality of data streams in a wireless system comprising:
receiving one or more frames at one or more radio frequencies;
obtaining a location of an additional physical slot of each frame; and
receiving data streams allocated to the additional physical slot,
further comprising obtaining signaling information for receiving data stream mapped to the additional physical slot, and
wherein the signaling information includes P1, L1-pre and L1-post information, and the L1-post information includes L1-config and L1-dynamic information, and
wherein when consecutive logical frames form a logical channel, one or more frames are transmitted at more than one radio frequency, and there is more than one logical channel, one logical channel is set as a primary logical channel, the remaining logical channel is set as a secondary logical channel, the L1-config and L1-dynamic information is arranged at the head of each of logical frames of the primary logical channel, and the L1-dynamic information is arranged at the head of each of logical frames of the secondary logical channel.

13. The method of claim 12, wherein the logical channel includes one or more superframes, the superframe includes a plurality of frames, and the L1-config information is additionally arranged at the head of each of superframes of the secondary logical channel.

14. A method for receiving data including a plurality of data streams in a wireless system, comprising:
receiving one or more frames at one or more radio frequencies;
obtaining a location of an additional physical slot of each frame; and
receiving data streams allocated to the additional physical slot,
further comprising obtaining signaling information for receiving data stream mapped to the additional physical slot, and
wherein thy signaling information includes P1, L1-pre and L1-post information, and the L1-post information includes L1-config and L1-dynamic information, and
wherein the L1-pre information includes any one of L1_OFFSET_TIME indicating the number of cells between L1-pre and L1-post, NGH_SLOT_INTERVAL indicating an interval between two consecutive Next Generation Handheld (NGH) slots, L1_OFFSET_FREQ indicating a Radio Frequency (RF) frequency of a next slot carrying a frame of a Logical NGH Channel (LNC) transmitted in a current slot, and LNC_OFFSET_DELTA indicating a gap between the current slot and the next slot carrying a frame of the current LNC.

15. An apparatus for receiving a broadcast frame in a wireless system, comprising:
a logical channel selector for extracting signaling information related to a logical channel; and
one or more Radio Frequency (RF) selector for receiving an RF signal and selecting a physical slot selected by the logical channel selector, wherein the signaling information includes P1, L1-pre and L1-post information, and the L1-post information includes L1-config and L1-dynamic information, and wherein the P1 and L1-pre information is allocated in every additional physical slot.

16. An apparatus for receiving a broadcast frame in a wireless system, comprising:

a logical channel selector for extracting signaling information related to a logical channel; and one or more Radio Frequency (RF) selector for receiving an RF signal and selecting a physical slot selected by the logical channel selector, wherein the signaling information includes P1, L1-pre and L1-post information, and the L1-post information includes L1-config and L1-dynamic information, and wherein when the one or more frames are transmitted at one radio frequency, the L1-config and L1-dynamic information is arranged at the head of each of the logical frames.

17. An apparatus for receiving a broadcast frame in a wireless system, comprising:

a logical channel selector for extracting signaling information related to a logical channel; and one or more Radio Frequency (RF) selector for receiving an RF signal and selecting a physical slot selected by the logical channel selector, wherein the signaling information includes P1, L1-pre and L1-post information, and the L1-post information includes L1-config and L1-dynamic information, and wherein when consecutive logical frames form a logical channel, one or more frames are transmitted at more than one radio frequency, and there is more than one logical channel, one logical channel is set as a primary logical channel, the remaining logical channel is set as a secondary logical channel, the L1-config and L1-dynamic information is arranged at the head of each of logical frames of the primary logical channel, and the L1-dynamic information is arranged at the head of each of logical frames of the secondary logical channel.

18. An apparatus for receiving a broadcast frame in a wireless system, comprising a logical channel selector for extracting signaling information related to a logical channel; and one or more Radio Frequency (RF) selector for receiving an RF signal and selectin, a physical slot selected by the logical channel selector, wherein the signaling information includes P1, L1-pre and L1-post information, and the L1-post information includes L1-config and L1-dynamic information, and wherein the L1-pre information includes any one of L1_OFFSET_TIME indicating the number of cells between L1-pre and L1-post, NGH_SLOT_INTERVAL indicating an interval between two consecutive Next Generation Handheld (NGH) slots, L1_OFFSET_FREQ indicating a Radio Frequency (RF) frequency of a next slot carrying a frame of a Logical NGH Channel (LNC) transmitted in a current slot, and LNC_OFFSET_DELTA indicating a gap between the current slot and the next slot carrying a frame of the current LNC.

* * * * *